United States Patent
Guo

(10) Patent No.: US 12,418,493 B2
(45) Date of Patent: Sep. 16, 2025

(54) DETERMINISTIC FLOW TRANSMISSION METHODS AND SYSTEMS, AND ELECTRONIC DEVICES

(71) Applicant: NEW H3C TECHNOLOGIES CO., LTD., Zhejiang (CN)

(72) Inventor: Daorong Guo, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 0 days.

(21) Appl. No.: 18/714,170

(22) PCT Filed: Jul. 19, 2022

(86) PCT No.: PCT/CN2022/106561
§ 371 (c)(1),
(2) Date: May 29, 2024

(87) PCT Pub. No.: WO2024/016175
PCT Pub. Date: Jan. 25, 2024

(65) Prior Publication Data
US 2025/0039103 A1 Jan. 30, 2025

(51) Int. Cl.
*H04L 47/283* (2022.01)
*H04L 47/56* (2022.01)

(52) U.S. Cl.
CPC ........... *H04L 47/283* (2013.01); *H04L 47/56* (2013.01)

(58) Field of Classification Search
CPC ....... H04L 47/283; H04L 47/56; H04L 47/28; H04L 47/50; H04L 67/60
See application file for complete search history.

(56) References Cited

U.S. PATENT DOCUMENTS

| | | | |
|---|---|---|---|
| 11,018,791 B2 * | 5/2021 | Götz | H04J 3/0697 |
| 2003/0231590 A1 * | 12/2003 | Zhao | H04L 49/3018 |
| | | | 370/230.1 |

(Continued)

FOREIGN PATENT DOCUMENTS

| | | |
|---|---|---|
| CN | 111431822 A | 7/2020 |
| CN | 112511329 A | 3/2021 |

(Continued)

OTHER PUBLICATIONS

European Patent Office, Extended European Search Report Issued in Application No. 22951453.4, Aug. 23, 2024, Germany, 8 pages.

(Continued)

*Primary Examiner* — Azizul Choudhury
(74) *Attorney, Agent, or Firm* — GREENBLUM & BERNSTEIN, P.L.C.

(57) ABSTRACT

Deterministic flow transmission methods and systems, and electronic devices are provided by the present application. In embodiments of the present application, the first service packet sent by the first transmission node within a certain scheduling cycle is specified to enter a certain cyclic scheduling queue of the second transmission node (that is, the specified cyclic scheduling queue), so as to ensure that the first service packet is scheduled and forwarded on time by the second transmission node. As such, even if there is jitter on the transmission link between the first transmission node and the second transmission node, due to both a scheduling cycle for the first transmission node to schedule and transmit the first service packet and a scheduling cycle for the second transmission node to schedule and transmit the first service packet can be directly determined, it can be ensured that the above-mentioned jitter has no influence on deterministic parameters of the first service packet (which is equivalent to (Continued)

de-jittering the above-mentioned jitter), and a deterministic flow transmission for the first service packet is realized.

15 Claims, 6 Drawing Sheets

(56) References Cited

U.S. PATENT DOCUMENTS

| | | | |
|---|---|---|---|
| 2018/0145781 A1* | 5/2018 | Chaloupka | H04J 3/0644 |
| 2018/0152377 A1 | 5/2018 | Wetterwald et al. | |
| 2020/0120036 A1* | 4/2020 | Zhou | H04L 12/56 |
| 2020/0213022 A1 | 7/2020 | Götz et al. | |
| 2021/0375129 A1* | 12/2021 | Meng | G06N 3/045 |
| 2024/0031302 A1* | 1/2024 | Francini | H04L 47/283 |
| 2024/0214323 A1* | 6/2024 | Cheng | H04L 47/34 |
| 2024/0275708 A1* | 8/2024 | Guo | H04L 43/067 |

FOREIGN PATENT DOCUMENTS

| | | |
|---|---|---|
| CN | 114500520 A | 5/2022 |
| EP | 3996301 A1 | 5/2022 |
| WO | 2023123102 A1 | 7/2023 |

OTHER PUBLICATIONS

ISA State Intellectual Property Office of the People's Republic of China, Written Opinion of the International Searching Authority Issued in Application No. PCT/CN2022/106561, Jan. 18, 2023, WIPO, 7 pages.

ISA State Intellectual Property Office of the People's Republic of China, International Search Report Issued in Application No. PCT/CN2022/106561, Jan. 18, 2023, WIPO, 4 pages.

"3rd Generation Partnership Project; Technical Specification Group Services and System Aspects; System architecture for the 5G System (5GS); Stage 2 (Release 17)", 3GPP TS 23.501 V17.1.1, Jun. 2021, 526 pages.

M. Chen et al., "Segment Routing (SR) Based Bounded Latency", China Mobile, May 7, 2019, 24 pages.

* cited by examiner

DETERMINISTIC FLOW TRANSMISSION METHODS AND SYSTEMS, AND ELECTRONIC DEVICES

CROSS-REFERENCE TO RELATED APPLICATION

The present application is a U.S. National Stage of International Application No. PCT/CN2022/106561, filed on Jul. 19, 2022, the contents of which are incorporated herein by reference in their entirety.

TECHNICAL FILED

The present application relates to network communication technology, in particular to deterministic flow transmission methods and systems, and electronic devices.

BACKGROUND

In some applications, taking 5th Generation System (5GS) which is used as a bridge for Time-Sensitive Networking (TSN) as an example, due to an internal transmission mechanism of the 5GS (for example, packet processing within an internal node and the like) and a retransmission introduced to realize reliability or the like, jitter often generates inside the 5GS. The jitter generated inside the 5GS means that there is jitter on a transmission link between transmission nodes connecting to the 5GS. Once there is jitter on the transmission link between the transmission nodes connecting both ends of the 5GS, a deterministic flow transmission between these two transmission nodes is affected. Similarly, there may also be jitter on a transmission link between two transmission nodes via a traditional network.

Therefore, in a scenario where jitter exists on the transmission link between transmission nodes, how to perform a deterministic flow transmission is a technical problem to be solved urgently.

SUMMARY

Embodiments of the present application provide deterministic flow transmission methods and systems, and electronic devices, so as to perform a deterministic flow transmission in a scenario where jitter presents on a transmission link between transmission nodes.

The embodiments of the present application provide the following technical solutions.

The embodiments of the present application provide a first deterministic flow transmission method, and the method is applicable to a first transmission node. Jitter presents on a transmission link between the first transmission node and a second transmission node, and clocks of the first and second transmission nodes are not synchronized. The method includes determining, for a first service packet belonging to a deterministic flow and to be transmitted to the second transmission node, specified queue information based on a scheduling and forwarding mapping correspondence between the first transmission node and the second transmission node, where the specified queue information indicates a specified cyclic scheduling queue, the specified cyclic scheduling queue is a cyclic scheduling queue that the first service packet enters after being transmitted to the second transmission node, such that the first service packet is set to be forwarded in a scheduling cycle corresponding to the specified cyclic scheduling queue, and deterministic forwarding for the first service packet is realized; and transmitting the first service packet carrying at least the specified queue information to the second transmission node.

The embodiments of the present application provide a second deterministic flow transmission method, and the method is applicable to a second transmission node. Jitter presents on a transmission link between a first transmission node and the second transmission node, and clocks of the first and second transmission nodes are not synchronized. The method includes receiving a third service packet belonging to a deterministic flow transmitted by the first transmission node; and distributing, based on specified queue information carried by the third service packet, data to be transmitted in the third service packet to a specified cyclic scheduling queue indicated by the specified queue information for scheduling and transmission, where the specified queue information is determined based on a scheduling and forwarding mapping correspondence between the first transmission node and the second transmission node, and the specified cyclic scheduling queue indicated by the specified queue information makes the third service packet set to be forwarded in a scheduling cycle corresponding to the specified cyclic scheduling queue, so as to realize deterministic forwarding for the third service packet.

The embodiments of the present application provide a deterministic flow transmission system, including a first transmission node and a second transmission node, where the first transmission node performs steps in the above first method, and the second transmission node performs steps in the above second method.

The embodiments of the present application further provide a deterministic flow transmission device, and the device is applicable to a first transmission node. Jitter presents on a transmission link between the first transmission node and a second transmission node, and clocks of the first and second transmission nodes are not synchronized. The device includes a determining unit, configured to determine, for a first service packet belonging to a deterministic flow and to be transmitted to the second transmission node, specified queue information based on a scheduling and forwarding mapping correspondence between the first transmission node and the second transmission node, where the specified queue information indicates a specified cyclic scheduling queue, the specified cyclic scheduling queue is a cyclic scheduling queue that the first service packet enters after being transmitted to the second transmission node, so that the first service packet is set to be forwarded in a scheduling cycle corresponding to the specified cyclic scheduling queue, and deterministic forwarding for the first service packet is realized; and a sending unit, configured to transmit the first service packet carrying at least the specified queue information to the second transmission node.

The embodiments of the present application further provide a deterministic flow transmission device, and the device is applicable to a second transmission node. Jitter presents on a transmission link between a first transmission node and the second transmission node, and clocks of the first and second transmission nodes are not synchronized. The device includes a receiving unit, configured to receive a third service packet belonging to a deterministic flow transmitted by the first transmission node; and a processing unit, configured to distribute, based on specified queue information carried by the third service packet, data to be transmitted in the third service packet to a specified cyclic scheduling queue indicated by the specified queue information for scheduling and transmission, where the specified queue information is determined based on a scheduling and forwarding mapping correspondence between the first transmission node and the second transmission node, and the specified cyclic scheduling queue indicated by the specified queue information makes the third service packet set to be forwarded in a scheduling cycle corresponding to the specified cyclic scheduling queue, so as to realize deterministic forwarding for the third service packet.

The embodiments of the present application further provide an electronic device. The electronic device includes a processor and a machine readable storage medium, where the machine readable storage medium stores machine executable instructions that can be executed by the processor. The processor executes the machine executable instructions to implement any one of the methods described above.

As can be seen from the above technical solutions that, in the embodiments of the present application, the first service packet sent by the first transmission node within a certain scheduling cycle is specified to enter a certain cyclic scheduling queue of the second transmission node (that is, the specified cyclic scheduling queue), so as to ensure that the first service packet is scheduled and forwarded on time by the second transmission node. As such, even if there is jitter on the transmission link between the first transmission node and the second transmission node, both a scheduling cycle for the first transmission node to schedule and transmit the first service packet and a scheduling cycle for the second transmission node to schedule and transmit the first service packet can be directly determined, ensuring that the above-mentioned jitter has no influence on deterministic parameters of the first service packet (which is equivalent to de-jittering the above-mentioned jitter), and realizing a deterministic flow transmission for the first service packet.

BRIEF DESCRIPTION OF THE DRAWINGS

The accompanying drawings, which are incorporated in and constitute a part of the present description, illustrate embodiments consistent with the present disclosure and together with the description serve to explain principles of the present disclosure.

DETAILED DESCRIPTION OF THE EMBODIMENTS

Exemplary embodiments will be described in detail herein, examples of which are illustrated in the accompanying drawings. When the following description refers to the accompanying drawings, the same numerals in different drawings refer to the same or similar elements unless otherwise indicated. The implementations described in the following exemplary embodiments do not represent all implementations consistent with the present application. Rather, they are merely examples of apparatuses and methods consistent with aspects of the present application. The terminology used in the present application is for the purpose of describing particular embodiments, and is not intended to limit the present application. As used in the present application, the singular forms "a", "said", and "the" are intended to include the plural forms as well, unless the context clearly dictates otherwise.

Through the deterministic flow transmission methods provided by the embodiments of the present application, even if there is jitter on a transmission link between two transmission nodes, a deterministic flow transmission between the two transmission nodes can be performed on a data plane, and the deterministic flow transmission no longer relies on strict synchronization for clocks of the two transmission nodes. For example, the realization of a deterministic flow transmission with a 5GS being taken as a TSN bridge no longer relies on clock synchronization among the 5GS and transmission nodes connecting the 5GS. The methods provided by the embodiments of the present application are described below.

Figure 1:
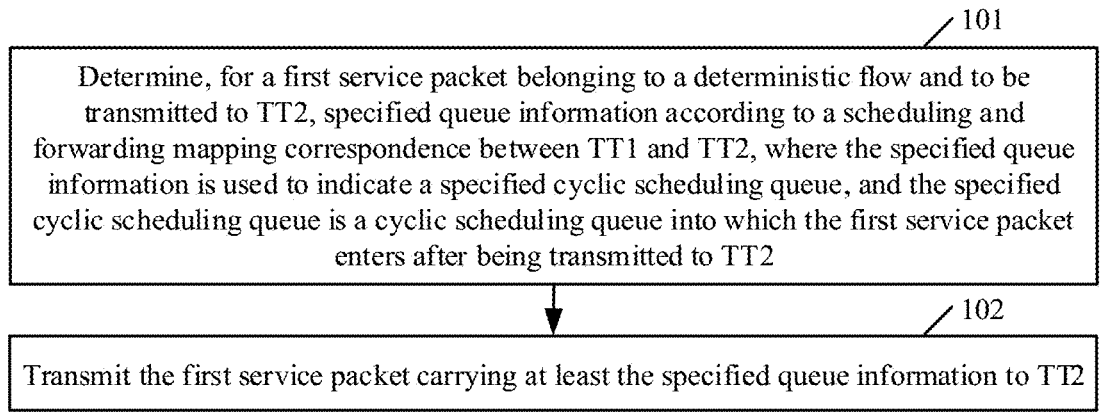
FIG. 1 is a method flowchart provided by the embodiments of the present application.

Referring to FIG. 1, which is a method flowchart provided by the embodiments of the present application, this method can be applied to a first transmission node (represented as TT1), and jitter presents on a transmission link between TT1 and a second transmission node (represented as TT2). The first transmission node and the second transmission node herein are named for convenience of description, and are not intended for limitation. It should be noted that in the present embodiments, there are some causes for jitter on the transmission link between TT1 and TT2. For example, internal logic processing (for example, an internal transmission mechanism) of an intermediate device (for example, the 5GS) on the transmission link between TT1 and TT2 causes jitter or generates factors sensitive to jitter and the like, the transmission link between TT1 and TT2 is considered to have jitter as well.

In an example, one of TT1 and TT2 may be a Device-side TSN Translator (DS-TT) connected to the 5GS, and the other one may be a Network-side TSN Translator (NW-TT) connected to the 5GS.

In another example, TT1 and TT2 may be two different DS-TTs connected to the 5GS as well.

In the present embodiments, clocks of TT1 and TT2 can be asynchronous, which means that transmission nodes (for example, the NW-TT and the DS-TT) connected to the 5GS at both ends do not rely on underlying hardware for clock synchronization, thereby reducing costs.

As shown in FIG. 1, the process can include the following steps.

At step 101, for a first service packet belonging to a deterministic flow and to be transmitted to TT2, specified queue information is determined according to a scheduling and forwarding mapping correspondence between TT1 and TT2, where the specified queue information is used to indicate a specified cyclic scheduling queue, and the specified cyclic scheduling queue is a cyclic scheduling queue into which the first service packet enters after being transmitted to TT2.

The first service packet herein generally refers to any service packet belonging to the deterministic flow and is to be transmitted to TT2, and the naming is for convenience of description rather than for limitation. It is to be clear that the first service packet here is different from a packet used for testing or maintenance, such as the following measurement and calibration request packet, maintenance packet and so on. For any service packet, when the service packet is received by TT1, the service packet is to enter a cyclic scheduling queue of TT1 and to be scheduled and transmitted.

In the present embodiments, the scheduling and forwarding mapping correspondence between TT1 and TT2 refers to a mapping correspondence between a time when TT1 schedules and forwards a packet and a time when TT2 schedules and forwards the packet, which can be implemented in many ways for specific implementations. For example, the scheduling and forwarding mapping correspondence between TT1 and TT2 may be represented by a scheduling cycle mapping correspondence between TT1 and TT2. The scheduling cycle mapping correspondence can refer to a mapping correspondence between a scheduling cycle corresponding to an outgoing interface (egress) forwarding the first service packet on TT1 and a scheduling cycle corresponding to an outgoing interface (egress) forwarding the first service packet on TT2. The scheduling and forwarding mapping correspondence between TT1 and TT2 may also be represented in other ways, which is not specifically limited in the present embodiments.

In the present embodiments, for an egress of any transmission node such as TT1, TT2 and the like, scheduling cycle division can be performed according to a fixed time interval, for example, 15 scheduling cycles are obtained from the division. Each scheduling cycle corresponds to a queue (also called as a cyclic scheduling queue). The scheduling cycles on the transmission node are rotated in sequence, and for each scheduling cycle, service packets in a corresponding cyclic scheduling queue are fixed to be sent in the scheduling cycle.

It should be noted that, for determining the above-mentioned scheduling and forwarding mapping correspondence in the present embodiments, presence of jitter on the transmission link between TT1 and TT2 is considered, which means that a final determined scheduling and forwarding mapping correspondence is determined on a premise that there is jitter on the transmission link between TT1 and TT2. Based on this premise, in step 101, the specified queue information, which is determined according to the above-mentioned scheduling and forwarding mapping correspondence, can ensure that the first service packet sent by TT1 at a certain scheduling cycle can enter a certain cyclic scheduling queue of TT2 (i.e., the specified cyclic scheduling queue) normally without being restricted by the jitter as well, thus reducing the impact of link jitter. Examples of how to determine the above-mentioned scheduling and forwarding mapping correspondence are described below, which will not be elaborated here.

In the present embodiments, the above-mentioned specified queue information may be an identifier of a cyclic scheduling queue, an identifier of a scheduling cycle, an identifier of a system cycle, or the like, which is not specifically limited in the present embodiment. In the present embodiments, a system cycle can be different from a scheduling cycle, and the system cycle can indicate the total number of scheduling cycles that have passed. While, the system cycle can also indicate a corresponding cyclic scheduling queue through conversion calculation. Examples of how to determine the above-mentioned specified queue information are described in the following, which will not be elaborated here. In the present embodiments, the specified queue information can make the first service packet set to be forwarded at a scheduling cycle corresponding to the specified cyclic scheduling queue, so as to realize the deterministic forwarding for the first service packet.

At step 102, the first service packet carrying at least the specified queue information is transmitted to TT2.

In one embodiment, while determining the above-mentioned specified queue information, a scheduling cycle for scheduling and transmitting the first service packet (referred to as a first scheduling cycle) can be further determined. Examples of how to determine the first scheduling cycle will be described below, which will not be repeated here. When the first scheduling cycle is determined, the first service packet (carrying the above-mentioned specified queue information) can be stored in a cyclic scheduling queue corresponding to the first scheduling cycle.

Based on this, in the present embodiments, transmitting the first service packet at least carrying the specified queue information to TT2 includes: during the first scheduling cycle, transmitting the first service packet, which is in a cyclic scheduling queue corresponding to the first scheduling cycle and carries at least the specified queue information, to TT2.

At this point, the process shown in FIG. 1 is finished.

Through the process shown in FIG. 1, the first service packet sent by TT1 within a certain scheduling cycle can be specified to enter a certain cyclic scheduling queue of TT2 (that is, the specified cyclic scheduling queue), so as to ensure that the first service packet is scheduled and forwarded on time at TT2. In this way, even if there is jitter in a transmission link between TT1 and TT2, a scheduling cycle (corresponding to the specified cyclic scheduling queue) for TT2 to schedule the transmission of the first service packet can be directly determined, ensuring that the above-mentioned jitter has no influence on deterministic parameters of the first service packet (which is equivalent to de-jittering the above-mentioned jitter), and realizing a deterministic flow transmission for the first service packet.

Figure 2:
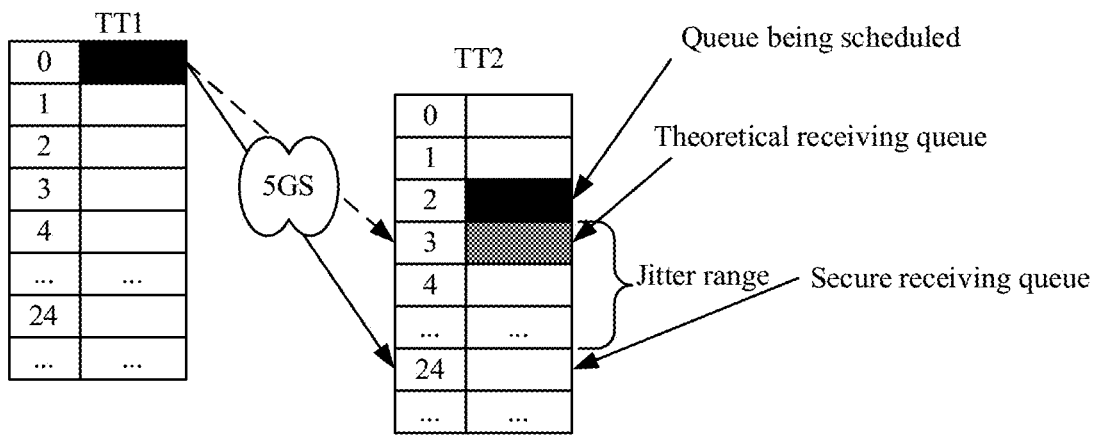
FIG. 2 is a schematic diagram of 5GS networking provided by the embodiments of the present application.

Taking the networking shown in FIG. 2 as an example, according to the process shown in FIG. 1, if a DS-TT (which is taken as TT1) schedules a transmission of one or more first service packets during scheduling cycle 0, and specify the one or more first service packets to, while being transmitted to a NW-TT (which is taken as TT2), enter a cyclic scheduling queue corresponding to scheduling cycle 24 of the NW-TT. In this way, when all the first service packet(s) are transmitted to the NW-TT, the first service packet(s) can be distributed to the cyclic scheduling queue corresponding to scheduling cycle 24 by the NW-TT. When the NW-TT performs scheduling during scheduling cycle 24, the first service packets can be scheduled to be sent out (for example, sent to a TSN network). This realizes deterministic flow forwarding on a data plane with taking the 5GS as a TSN bridge.

For how to determine the scheduling and forwarding mapping correspondence between TT1 and TT2, description is provided below.

For ease of understanding, the description is provided by taking that TT1 and TT2 are transmission nodes connected to ends of the 5GS as an example.

Figure 3:
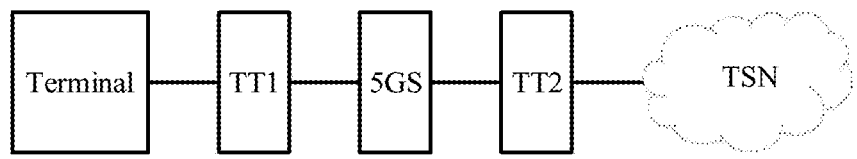
FIG. 3 is a networking structural diagram provided by the embodiments of the present application.

Firstly, to determine the above-mentioned scheduling and forwarding mapping correspondence between the two transmission nodes connected to the ends of the 5GS (that is, TT1 and TT2), in the present embodiments, the 5GS can be simply taken as a transmission channel, and forwarding on the data plane can be abstracted as a networking architecture shown in FIG. 3. Based on the networking shown in FIG. 3, a reference point model shown in FIG. 4 is established in the present embodiments.

Figure 4:
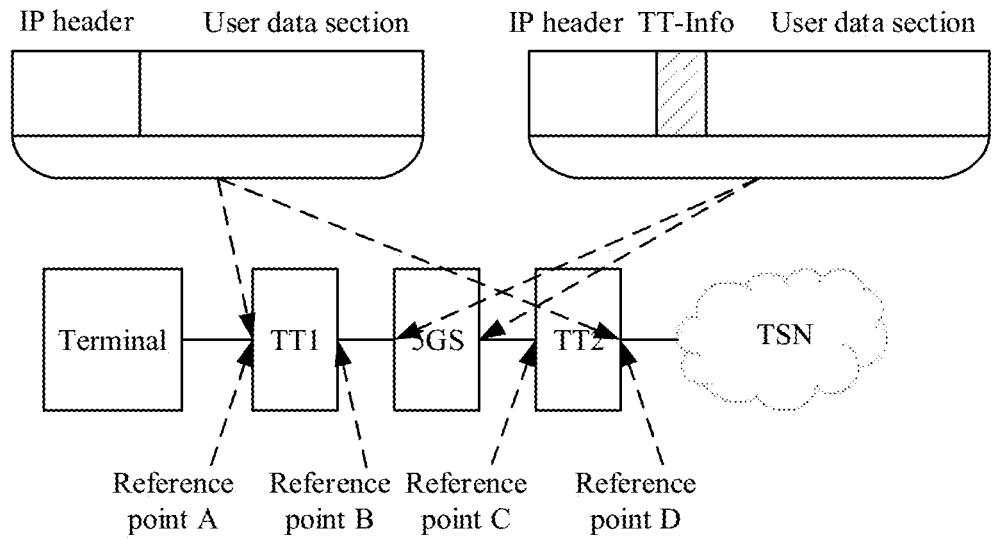
FIG. 4 is a structural diagram of a reference point model provided by the embodiments of the present application.

Without loss of generality, four reference points A, B, C, and D are defined in the present embodiments, where reference point A is an interface between an external device (a robot is taken as an example in FIG. 4) and TT1, reference point B is an interface between TT1 and the 5GS, reference point C is an interface between the 5GS and TT2, and reference point D is an interface between TT2 and an external device (a TSN network is taken as an example in FIG. 4).

Figure 5:
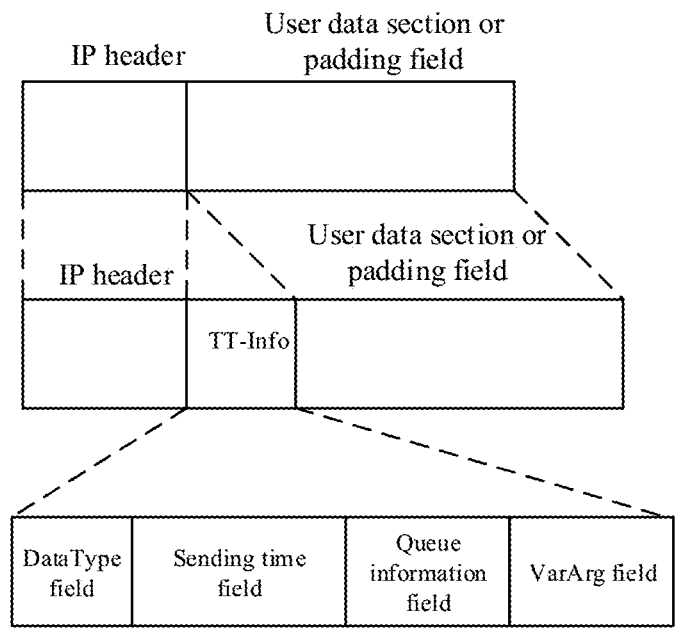
FIG. 5 is a schematic diagram of a packet provided by the embodiments of the present application.

In the reference point model shown in FIG. 4, for any packet in a deterministic flow transmitting through reference points B and C, if the packet does not carry transmission information (represented as TT-Info) currently, TT-Info can be carried in the packet as shown in FIG. 5. For example, for a packet belonging to a deterministic flow and being sent from TT1 to TT2, when the packet reaches reference point B, TT-Info is carried in the packet. Similarly, for a packet belonging to a deterministic flow and being sent from TT2 to TT1, when the packet reaches reference point C, TT-Info is added in the packet.

In the present embodiment, as shown in FIG. 5, TT-Info can contain at least the following fields.

The packet type (represented as DataType) field, which is used to carry DataType. For example, a value of DataType being 0x10 indicates a service packet belonging to a deterministic flow; the value of DataType being 0x01 indicates a measurement and calibration request packet; the value of DataType being 0x02 indicates a measurement and calibration response packet; the value of DataType being 0x03 indicates a maintenance packet for maintaining the scheduling and forwarding mapping correspondence; and the value of DataType being 0x13 indicates a service packet containing maintenance information. As for the maintenance information, an example will be described below and will not be elaborated here.

The sending time field, which carries a sending time. The sending time can be a system cycle, represented as TxCycles, for scheduling and sending a packet. For any service packet, if the service packet does not carry the above-mentioned maintenance information, the sending time field can be empty at this time.

The queue information field, which is used to carry the specified queue information. The specified queue information is used to indicate that a packet, after being transmitted to another transmission node, enters which cyclic scheduling queue of that another transmission node. While determining or maintaining the above-mentioned scheduling and forwarding mapping correspondence, the queue information field can be empty.

The variable parameter (represented as VarArg) field, which is used to carry VarArg. For example, in a case that DataType is of 0x02, VarArg can indicate a target transmission delay (represented as AnchorCycles). For another example, in a case that DataType is of 0x01, 0x03 or 0x13, VarArg can indicate a packet sequence ID. For example, if a sample space is K, a value of the packet sequence ID ranges from 1 to K.

Based on the reference point model shown in FIG. 4, the following example describes how to determine the above-mentioned scheduling and forwarding mapping correspondence between TT1 and TT2.

In one embodiment, the scheduling and forwarding mapping correspondence between TT1 and TT2 can depend on a target transmission delay between TT1 and TT2. However, due to a large range of jitter generated inside the 5GS, it is impossible to obtain a fixed target transmission delay between TT1 and TT2, and it is not suitable to measure the target transmission delay between TT1 and TT2 according to a delay measurement manner for wired network links. Based on this, in one embodiment, a transmission delay between TT1 and TT2 can be measured for a plurality of times (a transmission delay obtained from each measurement is recorded as a candidate transmission delay (represented as DeltaCycles)), and a candidate transmission delay meeting a predetermined condition can be determined and taken as the above-mentioned target transmission delay (denoted by AnchorCycles). The predetermined condition herein can be set according to actual needs, for example, having the smallest value. For example, if the predetermined condition indicates having the smallest value, in the present embodiment, a candidate transmission delay having the smallest value (denoted by MinDeltaCycles) can be taken as the above-mentioned AnchorCycles. That is, in one embodiment, the above-mentioned scheduling and forwarding mapping correspondence can be specifically determined according to TT1 trying to send K measurement and calibration request packets to TT2 through the above-mentioned egress, where K is greater than 1. An example for description is provided below.

TT1 can send K measurement and calibration request packets to TT2 through the above-mentioned outgoing interface within a set time window (represented as TimeWind). The set time window can be, for example, 1 second and the like, which is not specifically limited in the present embodiment. In the present embodiment, the number of sent measurement and calibration request packets is not limited, for example, the value of K is 1000 and the like. In the present embodiment, sending intervals for adjacent measurement and calibration requests, and even timing for sending the measurement and calibration requests are not limited.

In the present embodiment, TT-Info carried in each measurement and calibration request packet can be set to include the following fields.

The DataType field, which carries DataType having a value of 0x01, indicating a measurement and calibration request packet.

The sending time field, which carries a sending time. In one embodiment, the sending time may be a system cycle (marked as TxCycles) for sending a packet. While setting TxCycles, a process delay (marked as ProcessDelay) inside TT1 is to be comprehensively considered. For example, if ProcessDelay is 3 scheduling cycles, and if a measurement packet is to be sent when the system cycle (marked as sysCycles) is "a", by considering ProcessDelay, the measurement packet is actually sent at a+3. That is, TxCycles can be set to a+3. In another embodiment, the above-mentioned sending time may also be a scheduling cycle (marked as TxCycle). TxCycle can be determined through the following formula: TxCycle=TxCycles mod N1. For example, the above-mentioned TxCycles is a+3, TxCycle is: (a+3) mod N1. N1 is the total number of cyclic scheduling queues configured for TT1. In the present embodiment, TxCycles is taken as an example of the sending time for description.

The queue information field, which can be set to an invalid value, for example, 0xFFFFFFFF, in the case that DataType is of 0x01.

The VarArg field, which carries VarArg. VarArg can be an optional parameter. In one example, TT-Info may or may not carry the VarArg field. In the case that DataType is of 0x01, the VarArg field can carry a packet sequence ID of the measurement and calibration request packet. For example, if a sample space is K, the packet sequence ID is a value ranges from 1 to K.

In one embodiment, the above-mentioned measurement and calibration request packet can further carry a Differentiated Services Code Point (DSCP) field of Internet Protocol (IP), and a parameter carried in the DSCP field can be used to distinguish the measurement and calibration request packet from an existing best-effort flow (also called a non-deterministic flow). The DSCP field can carry a packet priority for representing a deterministic flow, for example, 63.

Taking that the sending time indicates TxCycles as an example, for each measurement and calibration request packet, TT1 can determine a scheduling cycle (TxCycle) according to the sending time TxCycles carried in the measurement and calibration request packet, and distribute the measurement and calibration request packet to a cyclic scheduling queue corresponding to TxCycle. Further, TT1 can send each measurement and calibration request packet in the cyclic scheduling queue corresponding to TxCycle to TT2 during TxCycle.

TT2 can collect packets via the 5GS. When a packet is collected, if the packet is identified as belonging to a deterministic flow based on the DSCP field carried in the packet (for example, the DSCP field in an IP header carries 63), as well as the packet is determined to be a measurement and calibration request packet according to DataType in TT-Info carried by the packet (for example, a value of DataType is 0x01, which indicates a measurement and calibration request packet), a system cycle (denoted by ArrCycles) when the measurement and calibration request packet arrives at TT2 can be recorded. And then, based on TxCycles in the TT-Info carried by the measurement and calibration request packet, a candidate transmission delay between TT1 and TT2 can be calculated.

In the present embodiments, while calculating the candidate transmission delay between TT1 and TT2, that TT1 and TT2 are not clock synchronized is to be considered. A difference between initial system cycle counts of TT1 and TT2 can be represented as OffsetCycles. In general, when a measurement and calibration request packet arrives at TT2, the system cycle ArrCycles of TT2 at this time can be approximately as: TxCycles (carried in the measurement and calibration request packet)+OffsetCycles+DelayCycles (representing a transmission delay between TT1 and TT2). If DeltaCycles=DelayCycles+OffsetCycles, according to ArrCycles and TxCycles, a relative difference can be obtained in reverse with the following approximate conclusion: DeltaCycles=ArrCycles−TxCycles. The relative difference is between a system cycle count of TT2 when the measurement and calibration request packet arrives at TT2, and a system cycle count when TT1 sends the measurement and calibration request packet. In one example, the relative difference DeltaCycles, which is between the system cycle count of TT2 and the system cycle count when TT1 sends the measurement and calibration request packet, can be represented as a candidate transmission delay between TT1 and TT2. For example, the candidate transmission delay between TT1 and TT2 indicates an absolute value of a difference between a recorded system cycle ArrCycles when a measurement and calibration request packet arrives at TT2, and TxCycles carried in the TT-Info of the measurement and calibration request packet.

As can be seen from the above way of calculating the candidate transmission delay between TT1 and TT2, although TT1 and TT2 have different timing systems, with merely performing approximate statistics on the relative difference, cumulative error of the two counts can be ignored when a plurality of measurement and calibration packets are distributed over a relatively short period of time.

In one example, in the present embodiment, TT2 can finish this collection when a collection finishing condition is satisfied. The collection finishing condition here may include, for example, collecting L measurement and calibration request packets, a length of time passed since collecting a first measurement and calibration request packet reaches a determined time length, etc., which are not specifically limited in the present embodiment.

Figure 6:
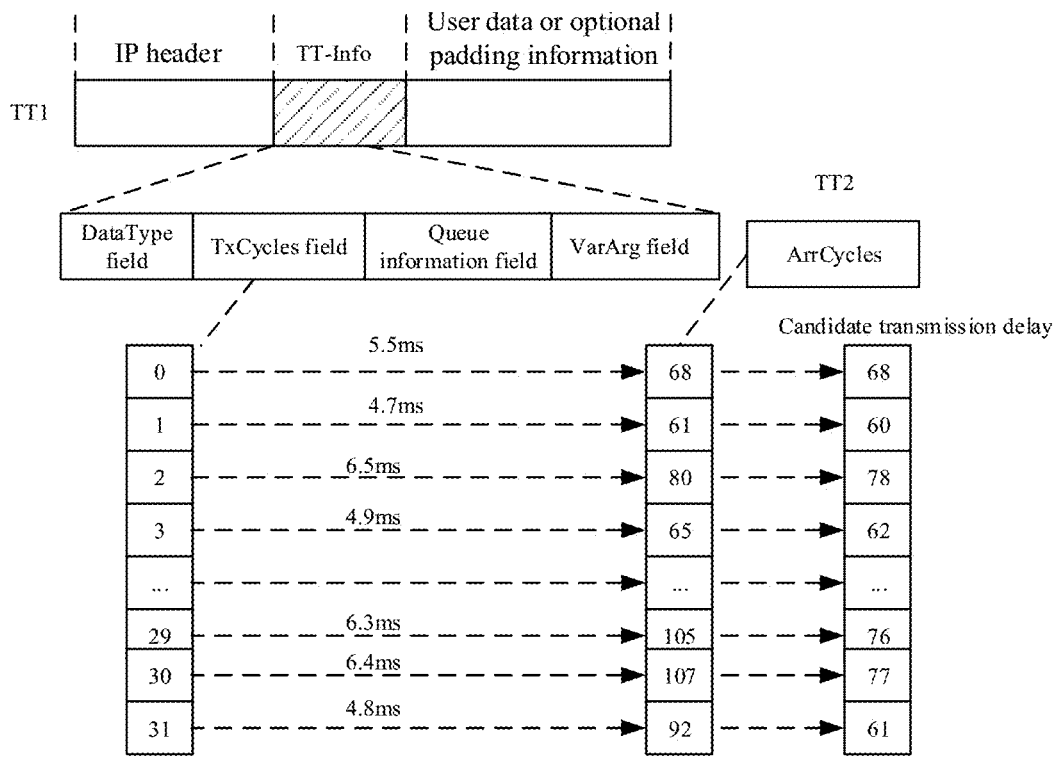
FIG. 6 is a schematic diagram of a transmission delay provided by the embodiments of the present application.

When TT2 finishes this collection, TT2 can select, from a plurality of determined candidate transmission delays between TT1 and TT2, a value meeting a predetermined condition as the above-mentioned target transmission delay (AnchorCycles). For example, assuming that TT1 sends measurement and calibration request packets in scheduling cycles 0 to 31 respectively, these measurement and calibration request packets arrive at TT2 after 5.5 ms, 4.7 ms, 6.5 ms, 4.9 ms, . . . , 6.3 ms, 6.4 ms and 4.8 ms respectively, and ArrCycles representing counts for packets arrived at TT2 are 68, 61, 80, . . . , 92 respectively, so the candidate transmission delays between TT1 and TT2 are shown in FIG. 6. For example, the predetermined condition is having the smallest value, TT2 can select the smallest value from a plurality of candidate transmission delays shown in FIG. 6, and take the selected value as the target transmission delay (AnchorCycles). For example, the smallest value 60 is selected as the target transmission delay AnchorCycles. That is, TT2 can determine the target transmission delay AnchorCycles between TT1 and TT2 by collecting a plurality of measurement and calibration request packets transmitted from TT1.

In one example, when TT2 determines the target transmission delay AnchorCycles, TT2 can forward the target transmission delay AnchorCycles to a network device independent of TT1 and TT2 (for example, a Software Defined Network (SDN) controller on a control plane). The network device can establish the above-mentioned scheduling and forwarding mapping correspondence according to the target transmission delay AnchorCycles. An example is provided below to describe how to establish the above-mentioned scheduling and forwarding mapping correspondence according to the target transmission delay AnchorCycles.

In another example, when TT2 determines the target transmission delay AnchorCycles, TT2 can also send the target transmission delay AnchorCycles to TT1, so that TF1 can establish the above-mentioned scheduling and forwarding mapping correspondence according to the target transmission delay AnchorCycles. For details of how to establish the above-mentioned scheduling and forwarding mapping correspondence according to the target transmission delay AnchorCycles, description is provided with an example below.

In the following, how TT2 sends the target transmission delay AnchorCycles to TT1 is described.

In one embodiment, TT2 can send a measurement and calibration response packet carrying the target transmission delay AnchorCycles to TT1. A source IP address and a destination IP address of the measurement and calibration response packet, are a destination IP address and a source IP address of the measurement and calibration request packet respectively. That is, the source IP address of the measurement and calibration response packet is an IP address of TT2, and the destination IP address of the measurement and calibration response packet is an IP address of TT1.

In the present embodiment, the target transmission delay AnchorCycles can be carried in TT-info of the measurement and calibration response packet. The TT-info in the measurement and calibration response packet can contain the following fields.

The DataType field, carries DataType which is set to 0x02 and indicates a measurement and calibration response packet.

The sending time field, for which reference can be made to the sending time field carried in TT-info of a measurement and calibration request packet described above.

The queue information field, which can be set to an invalid value, for example, 0xFFFFFFFF, in the case that DataType is set to 0x02.

The VarArg field, which can carry a variable parameter, and the variable parameter can be the above-mentioned target transmission delay AnchorCycles.

Similar to the above-mentioned measurement and calibration request packet, in the present embodiment, the measurement and calibration response packet can further carry a DSCP field of IP, and a parameter carried in the DSCP field can be used to distinguish the measurement and calibration response packet from an existing best-effort flow. The DSCP field can carry a packet priority for representing a deterministic flow, for example, 63.

Taking that the sending time indicates TxCycles as an example, for each measurement and calibration response packet, TT2 can determine a scheduling cycle TxCycle according to the sending time (for example, TxCycles) carried in the measurement and calibration response packet, and distribute the measurement and calibration response packet to a cyclic scheduling queue corresponding to TxCycle; and within TxCycle, TT2 can send the measurement and calibration response packet in the cyclic scheduling queue corresponding to TxCycle to TT1.

When TT1 receives the measurement and calibration response packet(s), TT1 can determine the above-mentioned scheduling and forwarding mapping correspondence according to the target transmission delay AnchorCycles carried in the measurement and calibration response packet(s).

The following describes how to determine the above-mentioned scheduling and forwarding mapping correspondence according to the target transmission delay Anchor-Cycles.

In the present embodiments, each of TT1 and TT2 has independent scheduling cycles. Due to a frequency offset and other factors, a cumulative deviation can be generated over a long period of time. When the cumulative deviation is greater than a certain threshold, it is considered that the generated deviation is to be adjusted. The threshold can be defined as CheckAreaCycles. In the present embodiment, CheckAreaCycles can be set according to actual needs. In the present embodiments, CheckAreaCycles indicating 2 Cycles (scheduling cycles) is taken as an example. In the present embodiments, CheckAreaCycles is to be considered while determining the above-mentioned scheduling and forwarding mapping correspondence.

In addition, the above-mentioned scheduling and forwarding mapping correspondence can be further related to a predetermined jitter range (denoted by BridgeJitter), a node process delay of TT1 (denoted by ProcessDelay1), and the like. In the present embodiments, BridgeJitter and ProcessDelay1 can be set according to actual needs. In the present embodiments, for example, BridgeJitter indicates 23 Cycles and ProcessDelay1 indicates 3 Cycles.

Based on the above description, in the present embodiments, according to AnchorCycles, BridgeJitter, ProcessDelay1 and CheckAreaCycles, the scheduling and forwarding mapping correspondence between TT1 and TT2 can be established. For example, a scheduling cycle deviation (denoted by AdjustCycles) between TT1 and TT2 is firstly determined according to AnchorCycles, BridgeJitter, ProcessDelay1 and CheckAreaCycles, and then AdjustCycles is determined as the scheduling and forwarding mapping correspondence between TT1 and TT2.

In one embodiment, the above-mentioned AdjustCycles can be represented through the following formula: AdjustCycles=AnchorCycles+CheckAreaCyles+BridgeJitter+ProcessDelay1.

Figure 7:
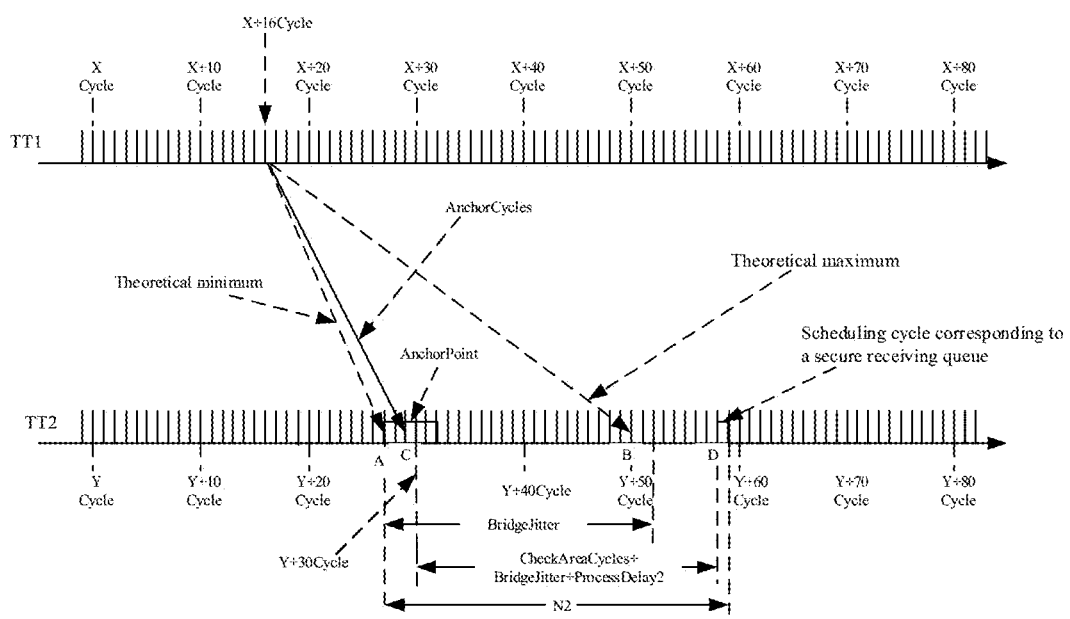
FIG. 7 is a schematic diagram of a delay between TT1 and TT2 provided by the embodiments of the present application.

In one embodiment, when the scheduling and forwarding mapping correspondence between TT1 and TT2 is determined, based on the scheduling and forwarding mapping correspondence between TT1 and TT2, a relation between a scheduling cycle (TxCycle) for TT1 to send a packet and a specified scheduling cycle (denoted by SpecfiedCycle) at which the packet is specified to enter TT2 can be determined. The relation is exemplified in the following formula: SpecfiedCycle=(TxCycle+AdjustCycles) mod N2, where N2 refers to the number of cyclic scheduling queues configured for TT2. In one example, N2 can be represented by the following formula: N2=CheckAreaCyles+1+CheckAreaCycles+BridgeJitter+ProcessDelay2+1, which is shown in FIG. 7. ProcessDelay2 refers to a node process delay of TT2. In applications, N2 can be equal to N1 described above.

If AnchorCycles indicates 60 Cycles and parameter values of CheckAreaCyles, BridgeJitter and ProcessDelay2 are the same as those of TT1, AdjustCycles can be 88 and N2 can be 32. Table 1 below shows an example of the relation between the scheduling cycle (TxCycle) for TT1 to send the packet and the specified scheduling cycle (SpecfiedCycle) at which the packet is specified to enter TT2.

TABLE 1

| TxCycle (TT1) | SpecfiedCycle (TT2) | Notes |
|---|---|---|
| 0 | 24 | AdjustCycles is 88, N2 is 32, |
| 1 | 25 | and SpecfiedCycle = (TxCycle + |
| 2 | 26 | 88)mod32 |
| 3 | 27 | |
| ... | ... | |
| 29 | 21 | |
| 30 | 22 | |
| 31 | 23 | |

Figure 8:
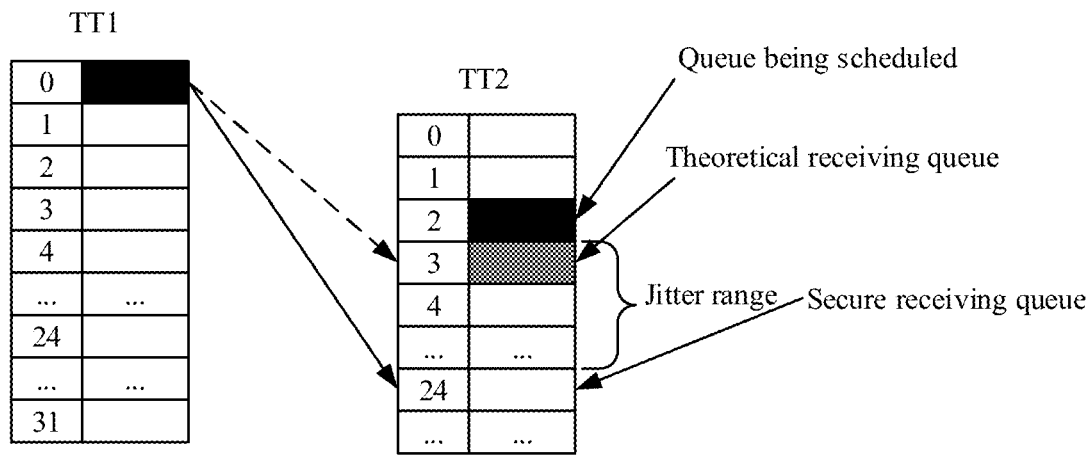
FIG. 8 is a schematic diagram of queue mapping between TT1 and TT2 provided by the embodiments of the present application.

In the present embodiments, for applying Table 1 to the above step 101, while TT1 is forwarding the above-mentioned first service packet, a scheduling cycle (denoted by a first scheduling cycle) at which TT1 is about to schedule and transmit the first service packet can be determined. According to the first scheduling cycle and the above-mentioned scheduling and forwarding mapping correspondence, specified queue information is determined. The specified queue information is used to instruct a cyclic scheduling queue of TT2 (which is a cyclic scheduling queue corresponding to an outgoing interface where TT2 forwards the first service packet specifically, also referred to as a specified cyclic scheduling queue) into which the first service packet enters. An example is illustrated in FIG. 8. For example, in FIG. 8, TT1 sends the first service packet through an outgoing interface for forwarding the first service packet within the first scheduling cycle (denoted by scheduling cycle 0) corresponding to the outgoing interface, and specifies the first service packet to enter the 25th scheduling cycle (denoted by scheduling cycle 24) corresponding to an outgoing interface for forwarding the first service packet on TT2, which can ensure the deterministic forwarding for the first service packet.

In one embodiment, the above-mentioned first scheduling cycle can be determined based on a deterministic flow information table (also called a target deterministic flow information table) that matches the first service packet. For example, a first scheduling cycle matching first time information is found from the target deterministic flow information table matching the first service packet, where the first time information is time information on receiving the first service packet.

In one embodiment, the above-mentioned first time information can include a scheduling cycle during which scheduling is currently being performed (in other words, a receiving scheduling cycle) when TT1 receives the first service packet. The deterministic flow information table can at least include: a matching relation between the receiving scheduling cycle and a scheduling cycle at which a packet is sent (also called a sending scheduling cycle). Based on this, the first scheduling cycle is a sending scheduling cycle that matches the currently scheduling cycle (i.e., the receiving scheduling cycle) when TT1 receives the first service packet. The first scheduling cycle refers to a scheduling cycle for sending the first service packet.

The above-mentioned deterministic flow information table is described below.

In applications, a service flow meeting a shaping condition often exists between TT1 and TT2. The shaping condition here can be set according to actual needs. For example, a service flow meeting the shaping condition can be a service flow forwarded by a certain specified terminal with jitter, or a service flow with access jitter and the like, which is not specifically limited in the present embodiment. In one embodiment, the above-mentioned service flow with the access jitter at least refers to a service flow meeting the following condition: the relationship between a forwarding cycle (for example, 1 picosecond (ps) and the like) for a terminal to forward the service flow and a sum of scheduling cycles of TT1/TT2 (for example, 150 microseconds (us) and the like) is not an integer multiple.

For the service flow meeting the shaping condition, shaping is to be performed on a matching relation between receiving scheduling cycle(s) and sending scheduling cycle(s) in a deterministic flow information table thereof.

Figure 9A:
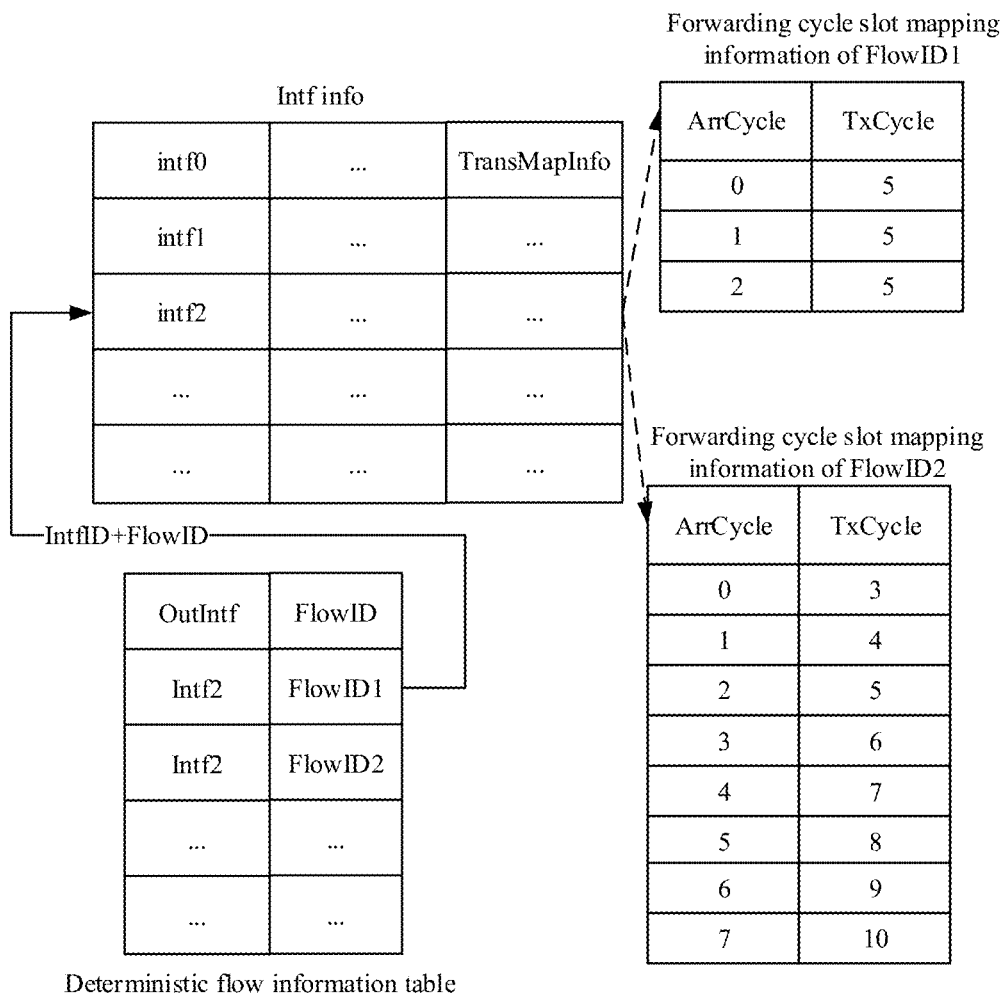
FIG. 9a is a schematic diagram of a deterministic flow forwarding table provided by the embodiments of the present application.

If service flow 1 (marked as FlowID1) meets the shaping condition, shaping is to be performed. If a packet belonging to FlowID1 is received, a system cycle of TT1 is "a" (that is, ArrCycles at this time is "a"), a scheduling cycle (ArrCycle) at which TT1 is performing scheduling is: a mod N1, and then TxCycle is calculated as follows:

TxCycle=TxCycles mod N1, where TxCycles=a−(a mod N1)+max(ArrCycle)+ProcessDelay1.

max(ArrCycle) refers to the one with the largest value among receiving scheduling cycles ArrCycle configured for FlowID1. As shown in FIG. 9a, ArrCycle configured for FlowID1 includes cycle 0, cycle 1, and cycle 2, and max(ArrCycle) is 2. ProcessDelay1 is set to 3 (indicating 3 scheduling cycles) as described above.

Based on this, if N1 is 32, TxCycle=5 can be calculated based on the above formula. Through the calculated TxCycle, it can be determined that when a packet of FlowID1 arrives at TT1, regardless of whether the scheduling cycle at which TT1 currently performs scheduling is cycle 0, cycle 1 or cycle 2 shown in FIG. 9a, the packet can eventually be stored in a cyclic scheduling queue (denoted by queue 5) corresponding to scheduling cycle 5 for scheduling and forwarding. That is, in the deterministic flow information table matching FlowID1, when receiving scheduling cycles are cycle 0, cycle 1, and cycle 2, these receiving scheduling cycles all match the same sending scheduling cycle (i.e., scheduling cycle 5), as shown in the forwarding cycle slot mapping information of FlowID1 in FIG. 9a. It should be noted that, to deal with some packet bursts, the above expression of TxCycles can also be updated as follows: TxCycles=a−(a mod N1)+max(ArrCycle)+ProcessDelay1+1. Correspondingly, the above TxCycle is updated to 6, and TxCycle in the forwarding cycle slot mapping information of FlowID1 in FIG. 9a is also updated from 5 to 6 accordingly, which is not described in detail here.

FIG. 9a shows an example of a matching relation between receiving scheduling cycles and sending scheduling cycles in the deterministic flow information table that matches FlowID1. It can be seen that, in the present embodiments, for a data flow meeting the predetermined shaping condition, at least two table entries with different receiving scheduling cycles have the same sending scheduling cycle in a matched target deterministic flow information table. Similarly, in the present embodiments, in a case that a data flow to which the first service packet belongs is a data flow meeting the predetermined shaping condition, in a target deterministic flow information table matching the data flow to which the first service packet belongs, there are items indicating that at least two different receiving scheduling cycles match the same sending scheduling cycle.

While for a service flow without shaping (taking FlowID2 as an example), in a matched deterministic flow information table, a case of at least two different receiving scheduling cycles matching the same sending scheduling cycle generally not exists. Referring to FIG. 9a, an example shows a matching relation between receiving scheduling cycles and sending scheduling cycles in a deterministic flow information table that matches FlowID2.

The deterministic flow information tables matching FlowIDs have been described above.

Based on the above deterministic flow information tables matching the FlowIDs, when a first service packet is received, TTT can search, from the deterministic flow information tables matching the FlowIDs, for a target deterministic flow information table matching a data flow to which the first service packet belongs. TTT can find, in the target deterministic flow information table matched with the first service packet, a sending scheduling cycle that matches a scheduling cycle at which TTT currently performs scheduling while receiving the first service packet. TT1 can determine that the found sending scheduling cycle is the above-mentioned first scheduling cycle.

Figure 9B:
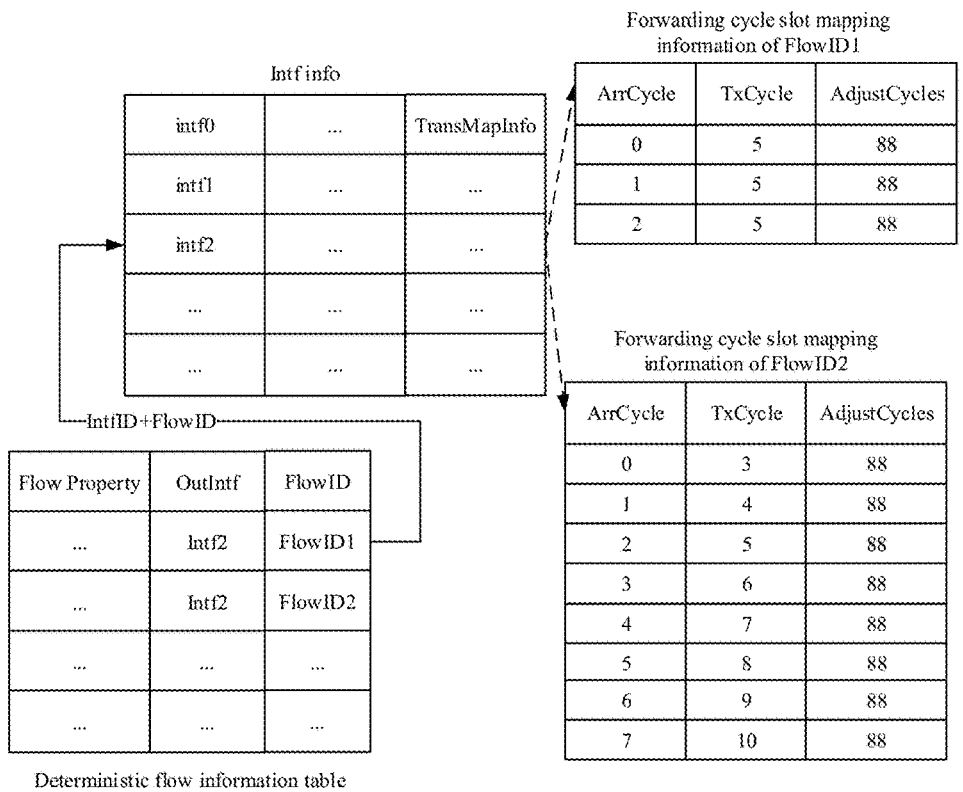
FIG. 9b is a schematic diagram of another deterministic flow forwarding table provided by the embodiments of the present application.

In addition, as described above, the above-mentioned scheduling and forwarding mapping correspondence between TTT and TT2 can be represented by the above-mentioned scheduling cycle deviation. In one embodiment, the above-mentioned scheduling cycle deviation can be added to a corresponding deterministic flow information table (for example, a deterministic flow information table corresponding to a deterministic flow forwarded through the above-mentioned egress), for example, the deterministic flow information table shown in FIG. 9b. The deterministic flow information table shown in FIG. 9b includes scheduling cycle information on each service flow (which includes a matching relation between receiving scheduling cycles (ArrCycle) and sending scheduling cycles (TxCycle), as well as the scheduling cycle deviation).

In another embodiment, the above-mentioned scheduling cycle deviation can be recorded to another location as well, for example, a specialized scheduling cycle deviation table, which is not specifically limited in the present embodiment. It should be noted that, if the above-mentioned scheduling cycle deviation is recorded to another location, the another location can further record, in addition to recording the above-mentioned scheduling cycle deviation, interface identifiers of a local egress of TT1 and a local egress of TT2. As such, it can be clarified that the scheduling cycle deviation is a deviation between a scheduling cycle corresponding to the local egress of TT1 and a scheduling cycle corresponding to the local egress of TT2.

It should be noted that, in the present embodiments, the above-mentioned AdjustCycles can be further properly adjusted according to actual needs, so as to guarantee sufficient flexibility and scalability.

Based on adding the above-mentioned scheduling cycle deviation to the deterministic flow information table described above, in the above step 101 of the present embodiments, for the received first service packet (the first service packet belongs to a deterministic flow), TT1 can search, according to a receiving scheduling cycle while receiving the first service packet, for a matched sending scheduling cycle (that is, the first scheduling cycle) and a scheduling cycle deviation from a target deterministic flow information table matching the first service packet. TT1 can determine a current first system cycle at the time of the first scheduling cycle according to the following formula: $TxCycles = ArrCycles - (ArrCycles \bmod N1) + TxCycle$, where TxCycles represents the first system cycle of TT1, ArrCycles indicates a receiving system cycle when TT1 receives the first service packet, N1 represents the number of cyclic scheduling queues configured for TT1, and TxCycle represents the first scheduling cycle of TT1. TT1 can then determine the above-mentioned specified queue information according to the first system cycle and the scheduling cycle deviation. For example, a second system cycle of TT2 can be determined according to the following formula: $SpecfiedCycles = TxCycles + AdjustCycles$, where SpecfiedCycles represents the second system cycle, TxCycles represents the first system cycle, and AdjustCycles represents the scheduling cycle deviation. The second system cycle may be determined as the specified queue information described above. Or, a second scheduling cycle of TT2 can be determined according to the second system cycle and the following formula: $SpecfiedCycle = SpecfiedCycles \bmod N2$, where SpecfiedCycle represents the second scheduling cycle, and SpecfiedCycles represents the second system cycle. The second scheduling cycle may be determined as the specified queue information described above.

Figure 10:
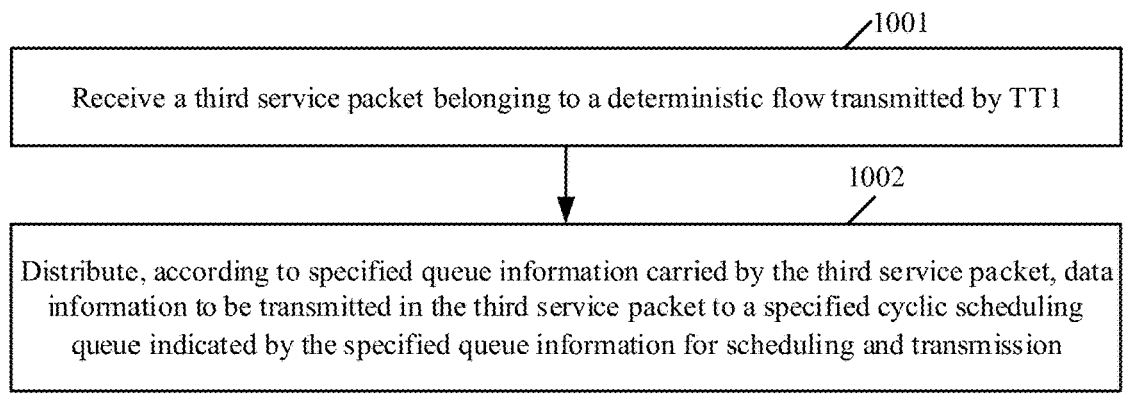
FIG. 10 is another method flowchart provided by the embodiments of the present application.

Correspondingly, the present embodiments further provide a method applied to the above-mentioned second transmission node, which is specifically shown in FIG. 10.

Referring to FIG. 10, which is another method process provided by embodiments of the present application. This process corresponds to the process shown in FIG. 1. As shown in FIG. 10, the process can include the following steps.

At step 1001, a third service packet belonging to a deterministic flow transmitted by TT1 is received.

In one example, the third service packet herein can be any service packet transmitted from TT1 to TT2 described above.

In one example, in the present embodiments, when a third service packet is received, whether a DSCP field in an IP header of the third service packet carries a deterministic data flow identifier (for example, 63) can be firstly identified. If the DSCP field in the IP header of the third service packet carries the deterministic data flow identifier (for example, 63), it can be determined that the third service packet belongs to a deterministic data flow.

At step 1002, according to specified queue information carried by the third service packet, data to be transmitted in the third service packet is distributed to a specified cyclic scheduling queue indicated by the specified queue information for scheduling and transmission.

In one embodiment, in this step 1002, the specified queue information can be taken out from the third service packet, and corresponding data encapsulation can be performed on the data to be transmitted in the third service packet (which can be other data information except TT-Info in the third service packet) to obtain a fourth service packet. According to the specified queue information described above, the fourth service packet can be stored in the specified cyclic scheduling queue indicated by the specified queue information. The fourth service packet in the specified cyclic scheduling queue can be scheduled and transmitted within a scheduling cycle for scheduling the specified cyclic scheduling queue.

In the present embodiment, if the above-mentioned specified queue information indicates a second system cycle, the above-mentioned specified cyclic scheduling queue can be determined through the following steps. The second scheduling cycle can be determined according to the following formula: $SpecfiedCycle = SpecfiedCycles \bmod N2$, where SpecfiedCycle represents the second scheduling cycle, SpecfiedCycles represents the above-mentioned second system cycle, and N2 represents the number of cyclic scheduling queues configured for TT2. A cyclic scheduling queue corresponding to the second scheduling cycle is determined as the above-mentioned specified cyclic scheduling queue.

If the above-mentioned specified queue information indicates the second scheduling cycle, the specified cyclic scheduling queue is the cyclic scheduling queue corresponding to the second scheduling cycle.

At this point, the process shown in FIG. 10 is finished.

Through the process shown in FIG. 10, the third service packet sent by TT1 within a certain scheduling cycle can be specified to enter a certain cyclic scheduling queue of TT2 (that is, the specified cyclic scheduling queue), so as to ensure that the third service packet is scheduled and forwarded during a specified scheduling cycle of TT2. In this way, even if there is jitter in a transmission link between TT1 and TT2, a scheduling cycle for TT2 to schedule and transmit the third service packet can be directly determined, ensuring that the above-mentioned jitter has no effect on deterministic parameters of the third service packet (which is equivalent to de-jittering the above-mentioned jitter), and realizing a deterministic flow transmission for the third service packet.

As described above, while establishing a scheduling and forwarding mapping correspondence between TT1 and TT2, TT1 can send measurement and calibration request packets to TT2. Accordingly, TT2 can receive one or more measurement and calibration request packets transmitted by TT1, and determine a candidate transmission delay between TT1 and TT2 based on each of the received measurement and calibration request packets. For the manner of determining a candidate transmission delay, specific reference can be made to the above.

TT2 can determine a target transmission delay from all candidate transmission delays, and the manner of determining the target transmission delay is described above as well, which will not be repeated here.

In one embodiment, TT2 can send the target transmission delay to TT1, such that TT1 can determine the scheduling and forwarding mapping correspondence between TT1 and TT2 according to the target transmission delay. The manner in which TT2 sends the target transmission delay to TT1 is described above, and will not be repeated here.

In another embodiment, TT2 can send the target transmission delay to another device independent of TT1 and TT2, for example, a SDN controller on a control plane. In this way, another device can determine the scheduling and forwarding mapping correspondence between TT1 and TT2 according to the target transmission delay, and send the scheduling and forwarding mapping correspondence to TT1.

It should be noted that, in the present embodiments, when the scheduling and forwarding mapping correspondence between TT1 and TT2 is determined, the above-mentioned scheduling and forwarding mapping correspondence between TT2 and TT1 is to be maintained.

In one embodiment, the above-mentioned TT1, which actively sends measurement and calibration packets, can be taken as a reference, and TT2 can perform cyclic mapping deviation detection. When a certain deviation threshold is reached, TT2 can adjust scheduling cycle(s) of TT2 to ensure that the scheduling and forwarding mapping correspondence between TT1 and TT2 is always valid and jitter is kept within a reasonable range, finally realizing the maintenance for the above-mentioned scheduling and forwarding mapping correspondence between TT2 and TT1. The following describes how to maintain the scheduling and forwarding mapping correspondence between TT1 and TT2.

Figure 11:
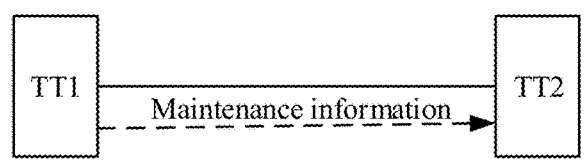
FIG. 11 is a schematic diagram illustrating maintenance to a scheduling and forwarding mapping correspondence provided by the embodiments of the present application.

As shown in FIG. 11, in the present embodiments, TT1 can send pieces of maintenance information to TT2 when a maintenance condition for maintaining the above-mentioned scheduling and forwarding mapping correspondence is satisfied, such that TT2 can determine whether to adjust scheduling cycle(s) of TT2 based on the received maintenance information. In one embodiment, the above-mentioned maintenance condition may be a cycle for maintaining the scheduling and forwarding mapping correspondence described above, for example, a set time window (represented as TimeWind) such as 1 second and the like. The above-mentioned maintenance condition is not specifically limited in the present embodiments. It should be noted that, in the present embodiment, timing for sending the maintenance information from TT1 to TT2 is not limited, the number of pieces of sent maintenance information and intervals for sending the maintenance information are not limited.

In one embodiment, the above-mentioned maintenance information can at least include a sending time, which is described below with examples.

In one embodiment, if the above-mentioned maintenance condition happens to be satisfied while forwarding a second service packet belonging to a deterministic flow to TT2, the above-mentioned maintenance information can be carried in the second service packet. In the present embodiment, the second service packet can carry TT-Info, where TT-Info can contain at least the following fields.

The DataType field, which carries DataType having a value of, for example, 0x13, indicating the second service packet carrying the maintenance information.

The sending time field, in one embodiment, a sending time carried in the sending time field can be determined according to a scheduling cycle for scheduling and sending the second service packet. For example, the sending time can be set to be a system cycle for sending the second service packet, and the system cycle can be determined in the following way. A matched deterministic flow information table can be found according to the second service packet, and a corresponding sending scheduling cycle can be found according to a receiving scheduling cycle for the second service packet from the deterministic flow information table. The system cycle can be determined according to the sending scheduling cycle (for the determination manner, reference can be made to the formula for calculating TxCycles described above).

The queue information field, which carries specified queue information and is used to indicate a cyclic scheduling queue of TT2 into which the second service packet is specified to enter. The specified queue information can be determined in a manner similar to that for determining the specified queue information in step 101 described above.

The VarArg field, which can be empty in the case that DataType is of 0x13.

In another embodiment, if no second service packet is to be forwarded to TT2 currently when the above-mentioned maintenance condition is satisfied, the above-mentioned maintenance information can be carried in a defined maintenance packet. In the present embodiments, the maintenance packet can carry TT-Info, where TT-Info can include at least the following fields.

The DataType field, carries DataType which has a value of, for example, 0x03 and indicates a defined maintenance packet.

The sending time field, in one embodiment, a sending time carried by the sending time field may be a system cycle (denoted by TxCycles) for sending the maintenance packet. While setting TxCycles, a process delay (denoted by ProcessDelay) inside TT1 is to be comprehensively considered. For example, if ProcessDelay is 3 scheduling cycles, and if the maintenance packet is to be sent when the system cycle (denoted by sysCycles) is "a", by considering ProcessDelay, the maintenance packet is actually sent at a+3, that is, TxCycles can be set to a+3. In another embodiment, the above-mentioned sending time may also be a scheduling cycle (denoted by TxCycle). TxCycle can be determined through the following formula: TxCycle=TxCycles mod N. For example, the above-mentioned TxCycles is a+3, and TxCycle is: (a+3) mod N, where N is the total number of cyclic scheduling queues configured for TT1. In the present embodiment, TxCycles is taken as an example of the sending time for description.

The queue information field, which can be set to an invalid value (for example, 0xFFFFFFFF) in the case that DataType is of 0x03.

The VarArg field, in the case that DataType is of 0x03, a variable parameter carried in the VarArg field can be set to a packet sequence ID of the maintenance packet. For example, if a sample space includes K packets, the packet sequence ID is a value ranges from 1 to K.

In one example, in the present embodiments, regardless of whether the maintenance information is carried by the second service packet or the maintenance packet, an IP header of each of these packets can further include a DSCP field. The DSCP field can carry a parameter to identify a deterministic flow and distinguish the deterministic flow from an existing best-effort flow. The parameter carried in the DSCP field can be a packet priority, for example, 63, used to represent a deterministic flow.

For example, the above-mentioned sending time is the system cycle TxCycles for sending the second service packet (carrying the maintenance information described above) or the maintenance packet. And then, TTT can determine a scheduling cycle TxCycle according to the above-mentioned sending time TxCycles, and distribute the second service packet (carrying the maintenance information described above) or the maintenance packet to a cyclic scheduling queue corresponding to TxCycle. Further, TTT can send the second service packet (carrying the maintenance information described above) or the maintenance packet in the cyclic scheduling queue corresponding to TxCycle to TT2 during TxCycle.

TT2 can collect packets via a 5GS. When a packet is collected, the packet may be identified as belonging to a deterministic flow based on the DSCP field carried in the packet (for example, the DSCP field in an IP header carries 63). Further, according to DataType in TT-Info carried by the packet, if the packet is determined to be a maintenance packet (for example, a value of DataType is 0x03, which indicates a maintenance packet), or to be a service packet carrying maintenance information (for example, a value of DataType is 0x13, which indicates a service packet carrying maintenance information), a system cycle (denoted by ArrCycles) when the packet arrives at TT2 can be recorded. And then, based on the sending time (for example, TxCycles) carried in the TT-Info of the packet, a candidate transmission delay between TTT and TT2 can be calculated. The calculation of the candidate transmission delay is as described above, which will not be repeated here.

In one example, in the present embodiment, TT2 can finish this collection when a collection finishing condition is satisfied. The collection finishing condition may include, for example, collecting L pieces of maintenance information, a length of time passed since collecting first maintenance information reaches a determined time length and the like, which is not specifically limited in the present embodiment.

When TT2 finishes this collection, TT2 can select, from a plurality of determined candidate transmission delays between TTT and TT2, a candidate transmission delay meeting a predetermined condition as a reference transmission delay (denoted by MinDeltaCycles). The determination for the reference transmission delay MinDeltaCycles is similar to the determination for the above-mentioned target transmission delay AnchorCycles.

TT2 can determine, based on the reference transmission delay MinDeltaCycles and the above-mentioned target transmission delay AnchorCycles, whether to adjust scheduling cycle(s) of TT2, for example, to adjust a duration of a scheduling cycle of TT2 and the like.

In one example, if MinDeltaCycles>AnchorCycles+CheckAreaCycles or MinDeltaCycles<AnchorCycles−CheckAreaCycles, where CheckAreaCycles is as described above, it can be determined to adjust a scheduling cycle of TT2, for example, to adjust a duration of a scheduling cycle of TT2. Otherwise, it can be determined not to adjust the scheduling cycle of TT2.

In the present embodiment, when the scheduling cycle of TT2 is determined to be adjusted, the duration of the scheduling cycle of TT2 can be adjusted. For example, the duration of the scheduling cycle can be changed from a current C1 to C2 which is different from C1.

In one example, C2 can be represented by BaseCycleTicks+Jitter_Adjustment counter units, a counter unit can be represented by, for example, a unit or a clock tick (denoted by Tick).

In the present embodiment, an absolute value of Jitter_Adjustment can represent the total number of counter units that are to be adjusted within a scheduling cycle, which can be set according to actual needs. If MinDeltaCycles>AnchorCycles+CheckAreaCycles, Jitter_Adjustment can be a positive number, that is, a sign is "+". If MinDeltaCycles<AnchorCycles−CheckAreaCycles, Jitter_Adjustment can be a negative number, that is, the sign is "−". AnchorCycles and CheckAreaCycles are described above separately, which are not repeated here.

In one embodiment, BaseCycleTicks can be obtained by performing translation on BaseCycleTime. A unit of BaseCycleTime can be a time unit, for example, ps and the like, and a unit of BaseCycleTicks can be a counter unit, for example, a clock tick (Tick).

If MinDeltaCycles>AnchorCycles+CheckAreaCycles, BaseCycleTime=C1+delta. If MinDeltaCycles<AnchorCycles−CheckAreaCycles, BaseCycleTime=C1−delta. In the present embodiment, delta can represent a predetermined adjustment amount, for example, delta=1<<8.

In the present embodiment, when L adjusted scheduling cycles are passed, the duration of the scheduling cycle can be restored to BaseCycleTime in time, and a scheduling cycle at this time can be recorded as a restored first scheduling cycle.

In one embodiment, L can be determined by the following formula: L=C1*JitterAdjustCycles/|Jitter_Adjustment|.

If MinDeltaCycles>AnchorCycles+CheckAreaCycles, JitterAdjustCycles=MinDeltaCycles−AnchorCycles, and if MinDeltaCycles<AnchorCycles−CheckAreaCycles, JitterAdjustCycles=AnchorCycles−MinDeltaCycles.

To make cumulative error change very slowly, in the present embodiment, the duration of the scheduling cycle can be further fine-tuned. For example, for an initial first scheduling cycle, or for the restored first scheduling cycle, if a duration T of a current scheduling cycle (that is, the initial first scheduling cycle, the restored first scheduling cycle) cannot be converted into an integer number of counter units, a deviation (denoted by Remain) corresponding to the current scheduling cycle is calculated. Remain can be represented by the following formula: Remain=g+T−T1_ticks*Unit. In a case that the current scheduling cycle is the initial first scheduling cycle or the restored first scheduling cycle, g can be a predetermined value, otherwise, g can be Remain of a previous scheduling cycle. T1_ticks can represent an integer number of counter units included in the current scheduling cycle, and Unit can represent a conversion relationship between time units and counter units.

T2_ticks for a next scheduling cycle can be set according to the following formula: T2_ticks=⌊(Remain+T)/Unit⌋, where ⌊ ⌋ represents rounding down. The next scheduling cycle can be taken as the current scheduling cycle, and the step of calculating the deviation corresponding to the current scheduling cycle can be performed again. By executing the above steps cyclically, it can be ensured that the final cumulative error is very small and the entire embodiment is not affected.

As can be seen from the process of maintaining the scheduling and forwarding mapping correspondence described above, in the present embodiment, a mechanism is established to make TT1 always follow the cyclic scheduling of TT2, so that the forwarding synchronization of TT1 and TT2 can be realized. For being applied to 5GS, clock synchronization between TT1, TT2 and 5GS is not needed, which can reduce the dependence on hardware, simplify the implementation of 5GS, and realize the transmission of deterministic flows as a whole.

The methods provided by the embodiments of the present application are described above, and systems and devices provided by the embodiments of the present application are described below.

The present embodiment provides a deterministic flow transmission system, which can include a first transmission node and a second transmission node. The first transmission node can execute steps in the process shown in FIG. 1, and the second transmission node can execute steps in the process shown in FIG. 10.

Figure 12:
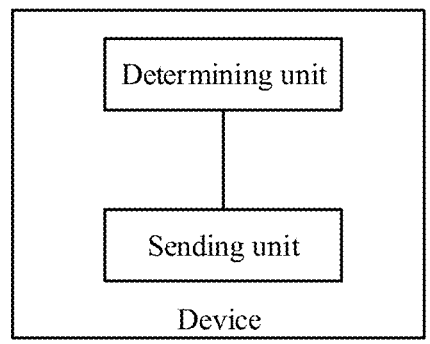
FIG. 12 is a device structural diagram provided by the embodiments of the present application.

Correspondingly, the embodiments of the present application further provide a structural diagram illustrating a device in FIG. 12. The device can be applied to a first transmission node, and there is jitter on a transmission link between the first transmission node and a second transmission node. The device can correspond to the process shown in FIG. 1.

As shown in FIG. 12, the device can include the following.

A determining unit, configured to determine, for a first service packet belonging to a deterministic flow and to be transmitted to the second transmission node, specified queue information based on a scheduling and forwarding mapping correspondence between the first transmission node and the second transmission node, where the specified queue information indicates a specified cyclic scheduling queue, the specified cyclic scheduling queue is a cyclic scheduling queue that the first service packet enters after being transmitted to the second transmission node, so that the first service packet is set to be forwarded in a scheduling cycle corresponding to the specified cyclic scheduling queue, and deterministic forwarding for the first service packet is realized.

A sending unit, configured to transmit the first service packet carrying at least the specified queue information to the second transmission node.

In one embodiment, the determining unit determining the specified queue information based on the obtained scheduling and forwarding mapping correspondence between the first transmission node and the second transmission node includes, determining a first scheduling cycle, where the first scheduling cycle is a scheduling cycle during which the first transmission node schedules and transmits the first service packet; and determining the specified queue information based on the scheduling and forwarding mapping correspondence between the first transmission node and the second transmission node. Prior to the sending unit transmitting the first service packet carrying at least the specified queue information to the second transmission node, the determining unit is further configured to store the first service packet to a first cyclic scheduling queue corresponding to the first scheduling cycle.

The sending unit transmitting the first service packet carrying at least the specified queue information to the second transmission node includes: scheduling the first service packet stored in the first cyclic scheduling queue during the first scheduling cycle, so as to transmit the first service packet carrying at least the specified queue information to the second transmission node.

In one embodiment, the determining unit determining the first scheduling cycle includes: finding a sending scheduling cycle matching first time information from a target deterministic flow information table matching the first service packet; and determining that the sending scheduling cycle matching the first time information is the first scheduling cycle, where the first time information is time information on receiving the first service packet.

In one embodiment, the target deterministic flow information table at least includes: a matching correspondence between receiving scheduling cycles and sending scheduling cycles, where the first time information is a first receiving scheduling cycle, and the first receiving scheduling cycle refers to a scheduling cycle during which the first transmission node performs scheduling while receiving the first service packet; and in a case that a data flow to which the first service packet belongs is a data flow meeting a predetermined shaping condition, the target deterministic flow information table includes multiple items, at least two items with different receiving scheduling cycles having a same sending scheduling cycle.

In an embodiment, the scheduling and forwarding mapping correspondence between the first transmission node and the second transmission node includes a scheduling cycle deviation between the first transmission node and the second transmission node.

The determining unit determining the specified queue information based on the scheduling and forwarding mapping correspondence between the first transmission node and the second transmission node includes: determining a current first system cycle at a time of the first scheduling cycle according to a following formula.

TxCycles=ArrCycles−(ArrCycles mod N1)+TxCycle, where TxCycles represents the first system cycle, ArrCycles represents a system cycle when the first transmission node receives the first service packet, N1 represents a number of cyclic scheduling queues configured for the first transmission node, and TxCycle represents the first scheduling cycle; and determining the specified queue information based on the first system cycle and the scheduling cycle deviation.

In one embodiment, determining the specified queue information based on the first system cycle and the scheduling cycle deviation includes: determining a second system cycle according to a following formula: SpecfiedCycles=TxCycles+AdjustCycles, where SpecfiedCycles represents the second system cycle, TxCycles represents the first system cycle, and AdjustCycles represents the scheduling cycle deviation; and determining the specified queue information based on the second system cycle.

In one embodiment, determining the specified queue information based on the second system cycle includes: determining that the second system cycle is the specified queue information; or determining a second scheduling cycle according to a following formula: SpecfiedCycle=SpecfiedCycles mod N, where SpecfiedCycle represents the second scheduling cycle, SpecfiedCycles represents the second system cycle; and determining that the second scheduling cycle is the specified queue information.

In one embodiment, the scheduling and forwarding mapping correspondence is determined by the first transmission node through sending K measurement and calibration request packets to the second transmission node according to the following steps: sending K measurement and calibration request packets to the second transmission node, where K is greater than 1; obtaining a target transmission delay, where the target transmission delay is selected from all candidate transmission delays determined by the second transmission node, and each candidate transmission delay is a transmission delay between the first transmission node and the second transmission node determined by the second transmission node based on a measurement and calibration request packet received; and determining the scheduling and forwarding mapping correspondence based on the target transmission delay.

In one embodiment, each of the measurement and calibration request packets carries a system cycle at which the first transmission node sends the measurement and calibration request packet, each of the candidate transmission delays is determined based on a system cycle at which the second transmission node receives the measurement and calibration request packet, and the system cycle carried by the measurement and calibration request packet, and the target transmission delay is a candidate transmission delay whose value meets a predetermined condition.

In one embodiment, determining the scheduling and forwarding mapping correspondence based on the target transmission delay includes: obtaining a predetermined jitter range, a process delay of the first transmission node, and a configured deviation adjustment threshold; and determining a scheduling cycle deviation between the first transmission node and the second transmission node based on the target transmission delay, the predetermined jitter range, the process delay and the deviation adjustment threshold, and determining the scheduling and forwarding mapping correspondence according to the scheduling cycle deviation.

In one embodiment, the sending unit is further configured to send maintenance information to the second transmission node in response to determining that a maintenance condition for maintaining the scheduling and forwarding mapping correspondence is satisfied, such that the second transmission node determines whether to adjust a scheduling cycle of the second transmission node based on the received maintenance information.

In one embodiment, the sending unit sending the maintenance information to the second transmission node includes: carrying the maintenance information in a second service packet belonging to a deterministic flow and sending the second service packet to the second transmission node, or carrying the maintenance information in a defined maintenance packet and sending the defined maintenance packet to the second transmission node; where the maintenance information at least includes a sending time, in a case that the maintenance information is carried in the second service packet, the sending time is determined based on a scheduling cycle for scheduling and sending the second service packet, and in a case that the maintenance information is carried in the defined maintenance packet, the sending time is determined based on a system cycle for sending the maintenance packet and a process delay of the first transmission node.

In one embodiment, the first transmission node and the second transmission node are different nodes connecting both ends of a 5 Generation System (5GS), and one of the first transmission node and the second transmission node is a Device Side Time Sensitive Networking (TSN) Translator (DS-TT) and the other one is a Network Side TSN translator (NW-TT), or the first transmission node and the second transmission node are two different DS-TTs.

At this point, the structural description for the device shown in FIG. 12 is finished.

Figure 13:
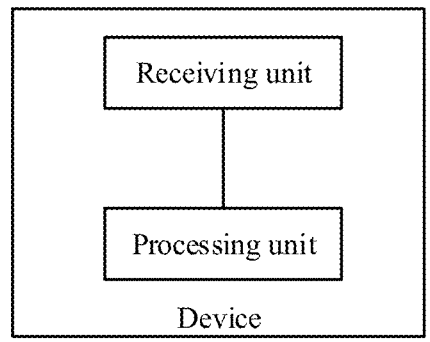
FIG. 13 is another device structural diagram provided by the embodiments of the present application.

Embodiments of the present application further provide a structural diagram of a device shown in FIG. 13. The device can correspond to the process shown in FIG. 10. The device can be applied to a second transmission node, there is jitter on a transmission link between the second transmission node and a first transmission node, and clocks of the first transmission node and the second transmission node are not synchronized. The device can include the following.

A receiving unit, configured to receive a third service packet belonging to a deterministic flow transmitted by the first transmission node.

A processing unit, configured to distribute, based on specified queue information carried by the third service packet, data to be transmitted in the third service packet to a specified cyclic scheduling queue indicated by the specified queue information for scheduling and transmission, where the specified queue information is determined based on a scheduling and forwarding mapping correspondence between the first transmission node and the second transmission node, and the specified cyclic scheduling queue indicated by the specified queue information makes the third service packet set to be forwarded in a scheduling cycle corresponding to the specified cyclic scheduling queue, so as to realize deterministic forwarding for the third service packet.

In one embodiment, the processing unit determines the specified cyclic scheduling queue indicated by the specified queue information through steps including: determining, in a case that the specified queue information indicates a second system cycle, a second scheduling cycle according to a following formula: SpecfiedCycle=SpecfiedCycles mod N2, where SpecfiedCycle represents the second scheduling cycle, SpecfiedCycles represents the second system cycle, and N2 represents a number of cyclic scheduling queues configured for the second transmission node; and determining that a cyclic scheduling queue corresponding to the second scheduling cycle is the specified cyclic scheduling queue; and determining, in a case that the specified queue information indicates the second scheduling cycle, that the cyclic scheduling queue corresponding to the second scheduling cycle is the specified cyclic scheduling queue.

In one embodiment, the receiving unit further receives measurement and calibration request packets transmitted by the first transmission node.

In one embodiment, the processing unit further determines, based on each of the received measurement and calibration request packets, a candidate transmission delay between the first transmission node and the second transmission node; and determines a target transmission delay between the first transmission node and the second transmission node by selecting a candidate transmission delay meeting a predetermined condition from all candidate transmission delays.

In one embodiment, the processing unit further sends the target transmission delay to the first transmission node, such that the first transmission node determines the scheduling and forwarding mapping correspondence between the first transmission node and the second transmission node based on the target transmission delay. In another embodiment, the processing unit further sends the target transmission delay to a third device independent of the first transmission node and the second transmission node, such that the third device determines the scheduling and forwarding mapping correspondence between the first transmission node and the second transmission node based on the target transmission delay, and distributes the scheduling and forwarding mapping correspondence to the first transmission node.

In one embodiment, each of the measurement and calibration request packets carries a system cycle at which the first transmission node sends the measurement and calibration request packet, each of the candidate transmission delays is determined based on a system cycle at which the second transmission node receives the measurement and calibration request packet, and the system cycle carried by the measurement and calibration request packet, and the target transmission delay is a candidate transmission delay whose value meets a predetermined condition.

In one embodiment, the receiving unit further receives pieces of maintenance information sent by the first transmission node within a predetermined time window.

Accordingly, the processing unit further determines, for each piece of maintenance information, a candidate transmission delay between the first transmission node and the second transmission node based on a sending time when the first transmission node sends the piece of maintenance information, and a receiving time when the second transmission node receives the piece of maintenance information, where the sending time is carried in the piece of maintenance information; determines a reference transmission delay meeting the predetermined condition from all the candidate transmission delays; and determines, based on the reference transmission delay and the target transmission delay, whether to adjust a scheduling cycle of the second transmission node.

In one embodiment, the processing unit determining, based on the reference transmission delay and the target transmission delay, whether to adjust the scheduling cycle of the second transmission node includes: determining to adjust the scheduling cycle of the second transmission node in a case that an absolute value of a difference between the reference transmission delay and the target transmission delay is greater than a configured deviation adjustment threshold; and determining not to adjust the scheduling cycle of the second transmission node in a case that the absolute value of the difference between the reference transmission delay and the target transmission delay is smaller than or equal to the configured deviation adjustment threshold.

In one embodiment, in a case of determining to adjust the scheduling cycle of the second transmission node, the processing unit further adjusts the scheduling cycle to change a duration of the scheduling cycle from C1 to C2 which is different from C1, where C2 is represented by BaseCycleTicks+Jitter_Adjustment counter units, Jitter_Adjustment represents the total number of counter units to be adjusted within a scheduling cycle, BaseCycleTicks is obtained by performing translation on BaseCycleTime, BaseCycleTime is in a unit of time and BaseCycleTicks is in a unit of counters.

In a case that MinDeltaCycles>AnchorCycles+CheckAreaCycles, BaseCycleTime=C1+delta, and in a case that MinDeltaCycles<AnchorCycles−CheckAreaCycles, BaseCycleTime=C1−delta, where MinDeltaCycles represents the reference transmission delay, AnchorCycles represents the target transmission delay, CheckAreaCycles represents a configured deviation adjustment threshold, and delta represents a predetermined adjustment amount.

In one embodiment, the processing unit further restores the duration of the scheduling cycle to BaseCycleTime after L adjusted scheduling cycles, where L is determined through a following formula: L=C1*JitterAdjustCycles/|Jitter_Adjustment|, where in a case that MinDeltaCycles>AnchorCycles+CheckAreaCycles, JitterAdjustCycles=MinDeltaCycles−AnchorCycles, and in a case that MinDeltaCycles<AnchorCycles−CheckAreaCycles, JitterAdjustCycles=AnchorCycles−MinDeltaCycles.

In one embodiment, for an initial first scheduling cycle, or for a restored first scheduling cycle, the processing unit further determines whether duration T of a current scheduling cycle (for example, the initial first scheduling cycle or the restored first scheduling cycle) is equal to an integer number of counter units; in a case that the duration T of the current scheduling cycle is not equal to the integer number of counter units, calculating Remain corresponding to the current scheduling cycle, where Remain is represented by a following formula: Remain=(g+T)−T1_ticks*Unit, in a case that the current scheduling cycle is the initial first scheduling cycle or the restored first scheduling cycle, g is a predetermined value, in a case that the current scheduling cycle is neither the initial first scheduling cycle nor the restored first scheduling cycle, g is Remain of a previous scheduling cycle, T1_ticks represents an integer number of counter units included in the current scheduling cycle, and Unit represents a conversion relationship between time units and counter units; sets T2_ticks for a next scheduling cycle according to a following formula: T2_ticks=⌊(Remain+T)/Unit⌋, where ⌊ ⌋ represents rounding down; and takes the next scheduling cycle as the current scheduling cycle, and performs determining whether the duration T of the current scheduling cycle is equal to the integer number of counter units.

In one embodiment, the first transmission node and the second transmission node are different nodes connecting both ends of a 5 Generation System (5GS), and one of the first transmission node and the second transmission node is a Device Side Time Sensitive Networking (TSN) Translator (DS-TT) and the other one is a Network Side TSN translator (NW-TT), or the first transmission node and the second transmission node are two different DS-TTs.

At this point, the structural description for the device shown in FIG. 13 is finished.

Figure 14:
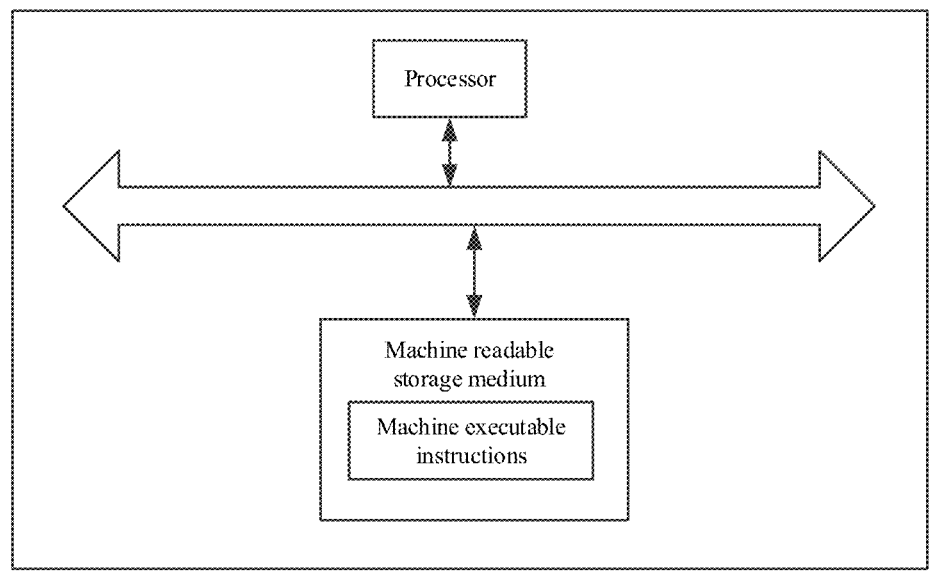
FIG. 14 is a structural diagram of an electronic device provided by the embodiments of the present application.

The embodiments of the present application further provide a hardware structure for the device shown in FIG. 12 or FIG. 13. Referring to FIG. 14, which is a structural diagram of an electronic device provided by the embodiments of the present application. As shown in FIG. 14, the hardware structure can include: a processor and a machine readable storage medium. The machine readable storage medium stores machine executable instructions that can be executed by the processor. The processor is used to execute the machine executable instructions to implement any one of the methods disclosed in the above examples of the present application.

Based on the same application concept as the methods described above, the embodiments of the present application further provide a machine readable storage medium, on which several computer instructions are stored. When the computer instructions are executed by a processor, the methods disclosed in the above examples of the present application can be implemented.

In an example, the above-mentioned machine readable storage medium may be any electronic, magnetic, optical, or other physical storage device that can contain or store information, such as executable instructions, data, etc. For example, the machine readable storage media may be: Random Access Memory (RAM), volatile memory, non-volatile memory, flash memory, storage drives (for example, hard drives), solid-state drives, any type of storage disk (such as optical disks, DVDs, etc.), or similar storage media, or a combination thereof.

The systems, devices, modules, or units illustrated in the above embodiments can be implemented by a computer chip or an entity, or by a product with certain functions. A typical implementation device is a computer, which can take the form of a personal computer, laptop, cellular phone, camera phone, smart phone, personal digital assistant, media player, navigation device, email sending and receiving device, game console, tablet computer, wearable device, or any combination of these devices.

For the convenience of description, the above devices are divided into various units according to functions and described separately. In implementing the present application, functions of various units can be implemented in the same or multiple software and/or hardware. Those skilled in the art should understand that the embodiments of the present application can be provided as methods, systems, or computer program products. Therefore, the present application may take the form of complete hardware embodiments, complete software embodiments, or embodiments combining software and hardware aspects. Moreover, the embodiments of the present application may take the form of computer program products implemented on one or more computer available storage media (including, but are not limited to, disk storage, CD-ROM, optical storage, etc.) containing computer available program codes.

The invention claimed is:

1. A deterministic flow transmission method, being applicable to a first transmission node, jitter presenting on a transmission link between the first transmission node and a second transmission node, clocks of the first and second transmission nodes being not synchronized, and the method comprising:
   determining, for a first service packet belonging to a deterministic flow and to be transmitted to the second transmission node, specified queue information based on a scheduling and forwarding mapping correspondence between the first transmission node and the second transmission node, wherein the specified queue information indicates a specified cyclic scheduling queue, the specified cyclic scheduling queue is a cyclic scheduling queue that the first service packet enters after being transmitted to the second transmission node, such that the first service packet is set to be forwarded in a scheduling cycle corresponding to the specified cyclic scheduling queue, and deterministic forwarding for the first service packet is realized; and
   transmitting the first service packet carrying at least the specified queue information to the second transmission node;
   wherein determining the specified queue information based on the scheduling and forwarding mapping correspondence between the first transmission node and the second transmission node comprises:
   determining a first scheduling cycle, wherein the first scheduling cycle is a scheduling cycle during which the first transmission node schedules and transmits the first service packet; and
   determining the specified queue information based on the scheduling and forwarding mapping correspondence between the first transmission node and the second transmission node;
   prior to transmitting the first service packet carrying at least the specified queue information to the second transmission node, the method further comprises:
   storing the first service packet to a first cyclic scheduling queue corresponding to the first scheduling cycle; and
   transmitting the first service packet carrying at least the specified queue information to the second transmission node comprises:
   scheduling the first service packet stored in the first cyclic scheduling queue during the first scheduling cycle, so as to transmit the first service packet carrying at least the specified queue information to the second transmission node;
   wherein the scheduling and forwarding mapping correspondence between the first transmission node and the second transmission node comprises a scheduling cycle deviation between the first transmission node and the second transmission node; and
   wherein determining the specified queue information based on the scheduling and forwarding mapping correspondence between the first transmission node and the second transmission node comprises:
   determining a current first system cycle at a time of the first scheduling cycle according to a following formula:

$$TxCycles = ArrCycles - (ArrCycles \bmod N1) + TxCycle,$$

wherein TxCycles represents the first system cycle, ArrCycles represents a system cycle when the first transmission node receives the first service packet, N1 represents a number of cyclic scheduling queues configured for the first transmission node, and TxCycle represents the first scheduling cycle; and
   determining the specified queue information based on the first system cycle and the scheduling cycle deviation;
   wherein determining the specified queue information based on the first system cycle and the scheduling cycle deviation comprises:
   determining a second system cycle according to a following formula:

$$SpecfiedCycles = TxCycles + AdjustCycles,$$

wherein SpecfiedCycles represents the second system cycle, TxCycles represents the first system cycle, and AdjustCycles represents the scheduling cycle deviation; and
   determining the specified queue information based on the second system cycle;
   wherein determining the specified queue information based on the second system cycle comprises:
   determining that the second system cycle is the specified queue information; or
   determining a second scheduling cycle according to a following formula: SpecfiedCycle = SpecfiedCycles mod N2, and determining that the second scheduling cycle is the specified queue information, wherein SpecfiedCycle represents the second scheduling cycle, SpecfiedCycles represents the second system cycle, and N2 represents a number of cyclic scheduling queues configured for the second transmission node.

2. The method according to claim 1, wherein determining the first scheduling cycle comprises:
   finding a sending scheduling cycle matching first time information from a target deterministic flow information table matching the first service packet; and
   determining that the sending scheduling cycle matching the first time information is the first scheduling cycle;

wherein the first time information is time information on receiving the first service packet.

3. The method according to claim 2, wherein the target deterministic flow information table at least comprises:
a matching correspondence between receiving scheduling cycles and sending scheduling cycles, wherein the first time information comprises a first receiving scheduling cycle, and the first receiving scheduling cycle refers to a scheduling cycle during which the first transmission node performs scheduling while receiving the first service packet, in a case that a data flow to which the first service packet belongs is a data flow meeting a predetermined shaping condition, the target deterministic flow information table comprises a plurality of items, wherein at least two items with different receiving scheduling cycles match a same sending scheduling cycle.

4. The method according to claim 1, wherein the scheduling and forwarding mapping correspondence is determined through steps of:
sending K measurement and calibration request packets to the second transmission node, wherein K is greater than 1;
obtaining a target transmission delay, wherein the target transmission delay is selected from all candidate transmission delays determined by the second transmission node, and each candidate transmission delay is a transmission delay between the first transmission node and the second transmission node determined by the second transmission node based on a measurement and calibration request packet received; and
determining the scheduling and forwarding mapping correspondence based on the target transmission delay;
wherein each of the measurement and calibration request packets carries a system cycle at which the first transmission node sends the measurement and calibration request packet,
each of the candidate transmission delays is determined based on the system cycle carried by the measurement and calibration request packet and a system cycle at which the second transmission node receives the measurement and calibration request packet, and
the target transmission delay is a candidate transmission delay whose value meets a predetermined condition;
wherein determining the scheduling and forwarding mapping correspondence based on the target transmission delay comprises:
obtaining a predetermined jitter range, a process delay of the first transmission node, and a configured deviation adjustment threshold;
determining a scheduling cycle deviation between the first transmission node and the second transmission node based on the target transmission delay, the predetermined jitter range, the process delay and the deviation adjustment threshold; and
determining that the scheduling cycle deviation is the scheduling and forwarding mapping correspondence.

5. The method according to claim 1, further comprising:
sending maintenance information to the second transmission node in response to determining that a maintenance condition for the scheduling and forwarding mapping correspondence is met, such that the second transmission node determines whether to adjust a scheduling cycle of the second transmission node based on the received maintenance information;

wherein sending the maintenance information to the second transmission node comprises:
carrying the maintenance information in a second service packet belonging to a deterministic flow and sending the second service packet to the second transmission node, or
carrying the maintenance information in a defined maintenance packet and sending the defined maintenance packet to the second transmission node,
wherein the maintenance information at least comprises a sending time, in a case that the maintenance information is carried in the second service packet, the sending time is determined based on a scheduling cycle for scheduling and sending the second service packet, and in a case that the maintenance information is carried in the defined maintenance packet, the sending time is determined based on a system cycle for sending the maintenance packet and a process delay of the first transmission node.

6. The method according to claim 1, wherein the first transmission node and the second transmission node are different nodes connecting both ends of a 5 Generation System (5GS), and one of the first transmission node and the second transmission node is a Device Side Time Sensitive Networking (TSN) Translator (DS-TT) and the other one is a Network Side TSN Translator (NW-TT), or the first transmission node and the second transmission node are two different DS-TTs.

7. A deterministic flow transmission method, being applicable to a second transmission node, jitter presenting on a transmission link between a first transmission node and the second transmission node, clocks of the first and second transmission nodes being not synchronized, and the method comprising:
receiving a third service packet belonging to a deterministic flow transmitted by the first transmission node; and
sending, based on specified queue information carried by the third service packet, data to be transmitted in the third service packet to a specified cyclic scheduling queue indicated by the specified queue information for scheduling and transmission, wherein the specified queue information is determined based on a scheduling and forwarding mapping correspondence between the first transmission node and the second transmission node, and the specified cyclic scheduling queue indicated by the specified queue information makes the third service packet set to be forwarded in a scheduling cycle corresponding to the specified cyclic scheduling queue, so as to realize deterministic forwarding for the third service packet;
wherein the method further comprises:
receiving measurement and calibration request packets transmitted by the first transmission node;
determining, based on each of the received measurement and calibration request packets, a candidate transmission delay between the first transmission node and the second transmission node; and
determining a target transmission delay between the first transmission node and the second transmission node by selecting a candidate transmission delay meeting a predetermined condition from all candidate transmission delays;
receiving pieces of maintenance information sent by the first transmission node within a predetermined time window;

determining, for each piece of maintenance information, a candidate transmission delay between the first transmission node and the second transmission node based on a sending time when the first transmission node sends the piece of maintenance information and a receiving time when the second transmission node receives the piece of maintenance information, wherein the sending time is carried in the piece of maintenance information;

determining a reference transmission delay meeting the predetermined condition from all the candidate transmission delays; and determining, based on the reference transmission delay and the target transmission delay, whether to adjust a scheduling cycle of the second transmission node;

wherein in a case of determining to adjust the scheduling cycle of the second transmission node, the method further comprises:

adjusting the scheduling cycle to change a duration of the scheduling cycle from C1 to C2 which is different from C1, wherein C2 is represented by BaseCycleTicks+Jitter Adjustment counter units, Jitter Adjustment represents a total number of counter units to be adjusted within a scheduling cycle, BaseCycleTicks is obtained by performing translation on BaseCycleTime, BaseCycleTime takes time as a unit and BaseCycleTicks takes counters as a unit, wherein in a case that Min DeltaCycles>AnchorCycles+CheckAreaCycles, BaseCycleTime=C1+delta, and in a case that MinDeltaCycles<AnchorCycles−CheckAreaCycles, BaseCycleTime=C1−delta, wherein MinDeltaCycles represents the reference transmission delay, AnchorCycles represents the target transmission delay, CheckAreaCycles represents a configured deviation adjustment threshold, and delta represents a predetermined adjustment amount.

8. The method according to claim 7, wherein the specified cyclic scheduling queue indicated by the specified queue information is determined through steps comprising:

determining, in a case that the specified queue information indicates a second system cycle, a second scheduling cycle according to a following formula: SpecfiedCycle=SpecfiedCycles mod N2, wherein SpecfiedCycle represents the second scheduling cycle, SpecfiedCycles represents the second system cycle, and N2 represents a number of cyclic scheduling queues configured for the second transmission node; and determining that a cyclic scheduling queue corresponding to the second scheduling cycle is the specified cyclic scheduling queue; and determining, in a case that the specified queue information indicates the second scheduling cycle, that the cyclic scheduling queue corresponding to the second scheduling cycle is the specified cyclic scheduling queue.

9. The method according to claim 7, further comprising: sending the target transmission delay to the first transmission node, such that the first transmission node determines the scheduling and forwarding mapping correspondence between the first transmission node and the second transmission node based on the target transmission delay.

10. The method according to claim 7, further comprising: sending the target transmission delay to a third device independent of the first transmission node and the second transmission node, such that the third device determines the scheduling and forwarding mapping correspondence between the first transmission node and the second transmission node based on the target transmission delay, and distributes the scheduling and forwarding mapping correspondence to the first transmission node.

11. The method according to claim 7, wherein each of the measurement and calibration request packets carries a system cycle at which the first transmission node sends the measurement and calibration request packet, each of the candidate transmission delays is determined based on the system cycle carried by the measurement and calibration request packet and a system cycle at which the second transmission node receives the measurement and calibration request packet, and the target transmission delay is a candidate transmission delay whose value meets a predetermined condition.

12. The method according to claim 7, wherein determining, based on the reference transmission delay and the target transmission delay, whether to adjust the scheduling cycle of the second transmission node comprises:

determining, in a case that an absolute value of a difference between the reference transmission delay and the target transmission delay is greater than a configured deviation adjustment threshold, to adjust the scheduling cycle of the second transmission node; and determining, in a case that the absolute value of the difference between the reference transmission delay and the target transmission delay is smaller than or equal to the configured deviation adjustment threshold, not to adjust the scheduling cycle of the second transmission node.

13. The method according to claim 7, further comprising: restoring the duration of the scheduling cycle to BaseCycleTime after L adjusted scheduling cycles, wherein L is determined through a following formula:

$$L = C1 * JitterAdjustCycles/|\text{Jitter\_Adjustment}|,$$

wherein in a case that MinDeltaCycles>AnchorCycles+CheckAreaCycles, JitterAdjustCycles=MinDeltaCycles−AnchorCycles, and in a case that MinDeltaCycles<AnchorCycles−CheckAreaCycles, JitterAdjustCycles=AnchorCycles−MinDeltaCycles;

wherein for an initial first scheduling cycle, or for a restored first scheduling cycle, the method further comprises:

determining whether duration T of a current scheduling cycle is equal to an integer number of counter units;

in a case that the duration T of the current scheduling cycle is not equal to the integer number of counter units, calculating Remain corresponding to the current scheduling cycle, wherein Remain is represented by a following formula: Remain=(g+T)−T1_ticks*Unit, in a case that the current scheduling cycle is the initial first scheduling cycle or the restored first scheduling cycle, g is a predetermined value, in a case that the current scheduling cycle is neither the initial first scheduling cycle nor the restored first scheduling cycle, g is Remain of a previous scheduling cycle, T1_ticks represents an integer number of counter units comprised in the current scheduling cycle, and Unit represents a conversion relationship between time units and counter units;

setting T2_ticks for a next scheduling cycle according to a following formula: T2_ticks=$\lfloor$(Remain+T)/Unit$\rfloor$, wherein $\lfloor \ \rfloor$ represents rounding down; and taking the next scheduling cycle as the current scheduling cycle, and performing determining whether the duration T of the current scheduling cycle is equal to the integer number of counter units.

14. The method according to claim 7, wherein the first transmission node and the second transmission node are different nodes connecting both ends of a 5 Generation System (5GS), and one of the first transmission node and the second transmission node is a Device Side Time Sensitive Networking (TSN) Translator (DS-TT) and the other one is a Network Side TSN Translator (NW-TT), or the first transmission node and the second transmission node are two different DS-TTs.

15. An electronic device, comprising a processor and a machine readable storage medium;

wherein the machine readable storage medium stores machine executable instructions that can be executed by the processor, and the processor, when executes the machine executable instructions, is configured to:

determine, for a first service packet belonging to a deterministic flow and to be transmitted to a second transmission node, specified queue information based on a scheduling and forwarding mapping correspondence between a first transmission node and the second transmission node, wherein the specified queue information indicates a specified cyclic scheduling queue, the specified cyclic scheduling queue is a cyclic scheduling queue that the first service packet enters after being transmitted to the second transmission node; and transmit the first service packet carrying at least the specified queue information to the second transmission node;

wherein jitter is presented on a transmission link between the first transmission node and the second transmission node, clocks of the first and second transmission nodes are not synchronized;

wherein the processor, when determining the specified queue information based on the scheduling and forwarding mapping correspondence between the first transmission node and the second transmission node, is configured to:

determine a first scheduling cycle, wherein the first scheduling cycle is a scheduling cycle during which the first transmission node schedules and transmits the first service packet; and determine the specified queue information based on the scheduling and forwarding mapping correspondence between the first transmission node and the second transmission node;

prior to transmitting the first service packet carrying at least the specified queue information to the second transmission node, the processor is further configured to:

store the first service packet to a first cyclic scheduling queue corresponding to the first scheduling cycle; and the processor, when transmitting the first service packet carrying at least the specified queue information to the second transmission node, is configured to:

schedule the first service packet stored in the first cyclic scheduling queue during the first scheduling cycle, so as to transmit the first service packet carrying at least the specified queue information to the second transmission node;

wherein the scheduling and forwarding mapping correspondence between the first transmission node and the second transmission node comprises a scheduling cycle deviation between the first transmission node and the second transmission node; and wherein the processor, when determining the specified queue information based on the scheduling and forwarding mapping correspondence between the first transmission node and the second transmission node, is configured to:

determine a current first system cycle at a time of the first scheduling cycle according to a following formula:

$$TxCycles = ArrCycles - (ArrCycles \bmod N1) + TxCycle,$$

wherein TxCycles represents the first system cycle, ArrCycles represents a system cycle when the first transmission node receives the first service packet, N1 represents a number of cyclic scheduling queues configured for the first transmission node, and TxCycle represents the first scheduling cycle; and determine the specified queue information based on the first system cycle and the scheduling cycle deviation;

wherein the processor, when determining the specified queue information based on the first system cycle and the scheduling cycle deviation, is configured to:

determine a second system cycle according to a following formula:

$$SpecfiedCycles = TxCycles + AdjustCycles,$$

wherein SpecfiedCycles represents the second system cycle, TxCycles represents the first system cycle, and AdjustCycles represents the scheduling cycle deviation; and determine the specified queue information based on the second system cycle;

wherein the processor, when determining the specified queue information based on the second system cycle, is configured to:

determine that the second system cycle is the specified queue information; or determine a second scheduling cycle according to a following formula: SpecfiedCycle=SpecfiedCycles mod N2, and determining that the second scheduling cycle is the specified queue information, wherein SpecfiedCycle represents the second scheduling cycle, SpecfiedCycles represents the second system cycle, and N2 represents a number of cyclic scheduling queues configured for the second transmission node.

* * * * *